US010123323B2

(12) United States Patent
Mallik et al.

(10) Patent No.: US 10,123,323 B2
(45) Date of Patent: Nov. 6, 2018

(54) DYNAMIC UPLINK/DOWNLINK FRAME STRUCTURE FOR ENHANCED COMPONENT CARRIERS

(71) Applicant: QUALCOMM Incorporated, San Diego, CA (US)

(72) Inventors: Siddhartha Mallik, San Diego, CA (US); Taesang Yoo, Riverside, CA (US); Jelena Damnjanovic, Del Mar, CA (US); Aleksandar Damnjanovic, Del Mar, CA (US); Arumugam Chendamarai Kannan, San Diego, CA (US); Yongbin Wei, La Jolla, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 156 days.

(21) Appl. No.: 14/862,997

(22) Filed: Sep. 23, 2015

(65) Prior Publication Data

US 2016/0119920 A1 Apr. 28, 2016

Related U.S. Application Data

(60) Provisional application No. 62/074,469, filed on Nov. 3, 2014, provisional application No. 62/068,277, filed on Oct. 24, 2014.

(51) Int. Cl.
*H04W 72/14* (2009.01)
*H04W 72/04* (2009.01)
*H04L 5/00* (2006.01)

(52) U.S. Cl.
CPC ......... *H04W 72/0446* (2013.01); *H04L 5/001* (2013.01); *H04L 5/0048* (2013.01);
(Continued)

(58) Field of Classification Search
CPC .. H04W 72/0046; H04L 5/001; H04L 5/0048; H04L 5/0053
See application file for complete search history.

(56) References Cited

U.S. PATENT DOCUMENTS

2012/0135773 A1\* 5/2012 Shen ............... H04L 5/0048
455/513
2013/0044651 A1\* 2/2013 Wang ............... H04W 72/0406
370/280

(Continued)

OTHER PUBLICATIONS

International Search Report and Written Opinion—PCT/US2015/051944—ISA/EPO—dated Dec. 11, 2015. (11 total pages).

*Primary Examiner* — Alex Skripnikov
*Assistant Examiner* — Pamit Kaur
(74) *Attorney, Agent, or Firm* — Anthony R. Morris

(57) ABSTRACT

Various aspects described herein relate to communicating using dynamic uplink and downlink transmission time interval (TTI) switching in a wireless network. A notification can be received from a network entity of switching a configurable TTI from downlink communications to uplink communications. The configurable TTI can be one of a plurality of TTIs in a frame structure that allows dynamic switching of configurable TTIs between downlink and uplink communications within a frame. Additionally, uplink communications can be transmitted to the network entity during the configurable TTI based at least in part on the notification.

30 Claims, 11 Drawing Sheets

(52) U.S. Cl.
CPC .......... *H04L 5/0053* (2013.01); *H04L 5/0094* (2013.01); *H04W 72/0406* (2013.01); *H04W 72/14* (2013.01)

(56) References Cited

U.S. PATENT DOCUMENTS

| | | | |
|---|---|---|---|
| 2013/0044713 A1* | 2/2013 | Suh ....................... | H04L 5/0048 370/329 |
| 2014/0269452 A1 | 9/2014 | Papasakellariou | |
| 2014/0293843 A1* | 10/2014 | Papasakellariou .. | H04W 72/042 370/280 |
| 2015/0188690 A1* | 7/2015 | Khoryaev ......... | H04W 52/0251 370/280 |

* cited by examiner

DYNAMIC UPLINK/DOWNLINK FRAME STRUCTURE FOR ENHANCED COMPONENT CARRIERS

CLAIM OF PRIORITY UNDER 35 U.S.C. § 119

The present application for patent claims priority to Provisional Application No. 62/068,277 entitled "BLIND UL/DL SYMBOL DETECTION IN DYNAMIC TDD SYSTEMS" filed Oct. 24, 2014, and Provisional Application No. 62/074,469 entitled "DYNAMIC UPLINK/DOWNLINK FRAME STRUCTURE FOR ENHANCED COMPONENT CARRIERS" filed Nov. 3, 2014, which are assigned to the assignee hereof and hereby expressly incorporated by reference herein.

BACKGROUND

Described herein are aspects generally related to communication systems, and more particularly, to frame structures utilized to communicate between nodes in a wireless communication system.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of a telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

For example, improvements are being proposed to further lower latency in LTE networks. As latency requirements are decreased, underlying frame structures presently supported in LTE may be incapable of effectively achieving the desired latency.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for communicating using dynamic uplink and downlink transmission time interval (TTI) switching in a wireless network is provided. The method includes receiving a notification from a network entity of switching a configurable TTI from downlink communications to uplink communications. The configurable TTI is one of a plurality of TTIs in a frame structure that allows dynamic switching of configurable TTIs between downlink and uplink communications within a frame. The method also includes transmitting uplink communications to the network entity during the configurable TTI based at least in part on the notification.

In other aspects, a user equipment for communicating using dynamic uplink and downlink TTI switching in a wireless network is provided. The user equipment includes a transceiver, at least one processor communicatively coupled with the transceiver via a bus for communicating signals in the wireless network, and a memory communicatively coupled with the at least one processor and/or the transceiver via the bus. The at least one processor and the memory are operable to receive, via the transceiver, a notification from a network entity of switching a configurable TTI from downlink communications to uplink communications. The configurable TTI is one of a plurality of TTIs in a frame structure that allows dynamic switching of configurable TTIs between downlink and uplink communications within a frame. The at least one processor and the memory are further operable to transmit, via the transceiver, uplink communications to the network entity during the configurable TTI based at least in part on the notification.

In another example, user equipment for communicating using dynamic uplink and downlink TTI switching in a wireless network is provided. The user equipment includes means for receiving a notification from a network entity of switching a configurable TTI from downlink communications to uplink communications. The configurable TTI is one of a plurality of TTIs in a frame structure that allows dynamic switching of configurable TTIs between downlink and uplink communications within a frame. The user equipment further comprises means for transmitting uplink communications to the network entity during the configurable TTI based at least in part on the notification.

In other aspects, a computer-readable storage medium comprising computer-executable code for communicating using dynamic uplink and downlink TTI switching in a wireless network is provided. The code includes code for receiving a notification from a network entity of switching a configurable TTI from downlink communications to uplink communications. The configurable TTI is one of a plurality of TTIs in a frame structure that allows dynamic switching of configurable TTIs between downlink and uplink communications within a frame. The code further includes code for transmitting uplink communications to the network entity during the configurable TTI based at least in part on the notification.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
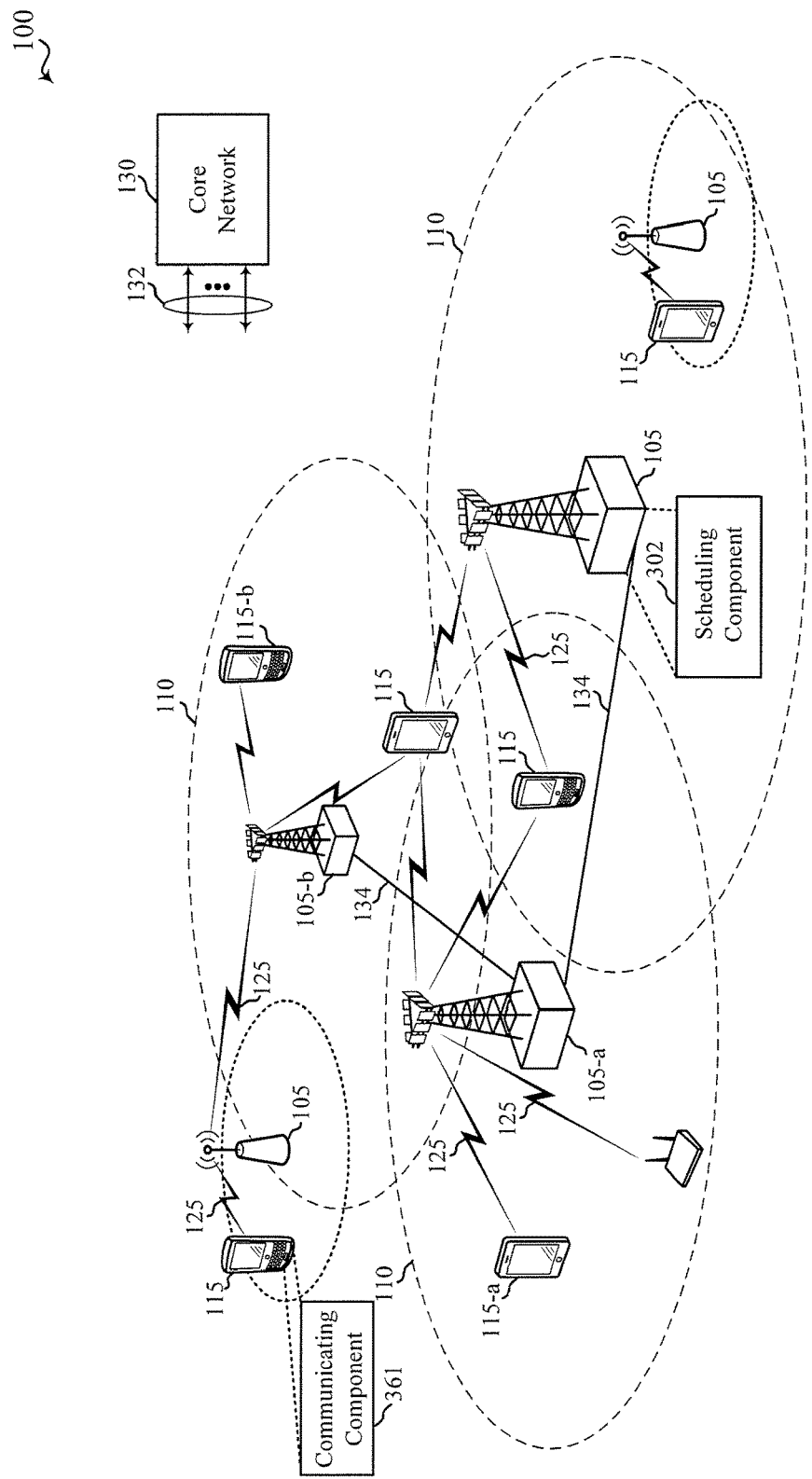
FIG. 1 shows a block diagram conceptually illustrating an example of a telecommunications system, in accordance with aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Described herein are various aspects related to communicating in a wireless network according to a frame structure that allows dynamic switching between uplink (UL) and downlink (DL) communications. For example, the frame structure can include a plurality of transmission time intervals (TTI) (e.g., time division duplexing (TDD) symbols), which can be configured or used for uplink or downlink communications. The frame structure may also include at least some TTIs that are dedicated downlink or uplink TTIs. For example, the dedicated downlink and uplink TTIs can be provided to enable radio resource management (RRM) measurements, synchronization between communicating nodes, channel state information (CSI) feedback, random access channel (RACH) communications, scheduling requests (SR), etc. In the remaining configurable TTIs, one or more communicating nodes can switch between uplink and downlink communications, and can notify other nodes of the switch. This allows the node to set the downlink/uplink configuration (e.g., of a given carrier) to facilitate improved communication throughput based on parameters of the one or more communicating nodes.

Referring first to FIG. 1, a diagram illustrates an example of a wireless communications system 100, in accordance with aspects described herein. The wireless communications system 100 includes a plurality of access points (e.g., base stations, eNBs, or WLAN access points) 105, a number of user equipment (UEs) 115, and a core network 130. Access points 105 may include a scheduling component 302 configured to communicate resource grants (e.g., for control and/or data uplink communications) to UEs 115 based on a frame structure, for example but not limited to frame structure 400 (FIG. 4), configured for lower latency communications. Similarly, one or more of UEs 115 may include a communicating component 361 configured to receive, decode, transmit, and operate using the frame structure (e.g., based on resource grants or other indicators received from an access point 105, as described herein).

Some of the access points 105 may communicate with the UEs 115 under the control of a base station controller (not shown), which may be part of the core network 130 or the certain access points 105 (e.g., base stations or eNBs) in various examples. Access points 105 may communicate control information and/or user data with the core network 130 through backhaul links 132. In examples, the access points 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

In this regard, a UE 115 can be configured to communicate with one or more access points 105 over multiple carriers using carrier aggregation (CA) (e.g., with one access point 105) and/or multiple connectivity (e.g., with multiple access points 105). In either case, UE 115 can be configured with at least one primary cell (PCell) configured to support uplink and downlink communications between UE 115 and an access point 105. It is to be appreciated that there can be a PCell for each communication link 125 between a UE 115 and a given access point 105. In addition, each of the communication links 125 can have one or more secondary cells (SCell) that can support uplink and/or downlink communications as well. In some examples, the PCell can be used to communicate at least a control channel, and the SCell can be used to communicate a data channel. In one example, the PCell and/or SCell can configure one or more enhanced component carriers (eCC) that provide lower latency communications (e.g., using frame structure 400 in FIG. 4 or a similar frame structure with lower latency TTIs), as described further herein.

In some examples, at least a portion of the wireless communications system 100 may be configured to operate on multiple hierarchical layers in which one or more of the UEs 115 and one or more of the access points 105 may be configured to support transmissions on a hierarchical layer that has a reduced latency with respect to another hierarchical layer. In some examples a hybrid UE 115-a may communicate with access point 105-a on both a first hierarchical layer that supports first layer transmissions with a first subframe type and a second hierarchical layer that supports second layer transmissions with a second subframe type. For example, access point 105-a may transmit subframes of the second subframe type that are time division duplexed with subframes of the first subframe type.

In some examples, hybrid UE 115-a may acknowledge receipt of a transmission by providing acknowledgement (ACK)/non-acknowledgement (NACK) for the transmission through, for example, a HARQ scheme. Acknowledgments from hybrid UE 115-a for transmissions in the first hierarchical layer may be provided, in some examples, after a predefined number of subframes following the subframe in which the transmission was received. The hybrid UE 115-a, when operating in the second hierarchical layer may, in examples, acknowledge receipt in a same subframe as the subframe in which the transmission was received. The time required to transmit an ACK/NACK and receive a retransmission may be referred to as round trip time (RTT), and thus subframes of the second subframe type may have a second RTT that is shorter than a RTT for subframes of the first subframe type.

In other examples, a second layer UE 115-b may communicate with access point 105-b on the second hierarchical layer only. Thus, hybrid UE 115-a and second layer UE 115-b may belong to a second class of UEs 115 that may communicate on the second hierarchical layer, while legacy UEs 115 may belong to a first class of UEs 115 that may communicate on the first hierarchical layer only. Access point 105-b and UE 115-b may communicate on the second hierarchical layer through transmissions of subframes of the second subframe type. Access point 105-b may transmit subframes of the second subframe type exclusively, or may transmit one or more subframes of the first subframe type on the first hierarchical layer that are time division multiplexed with subframes of the second subframe type. Second layer UE 115-b, in the event that access point 105-b transmits subframes of the first subframe type, may ignore such subframes of the first subframe type. Thus, second layer UE 115-b may acknowledge receipt of transmissions in a same subframe as the subframe in which the transmissions are received. Thus, second layer UE 115-b may operate with reduced latency compared to UEs 115 that operate on the first hierarchical layer.

The access points 105 may wirelessly communicate with the UEs 115 via one or more access point antennas. Each of the access points 105 sites may provide communication coverage for a respective coverage area 110. In some examples, access points 105 may be referred to as a base transceiver station, a radio base station, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include access points 105 of different types (e.g., macro, micro, and/or pico base stations). The access points 105 may also utilize different radio technologies, such as cellular and/or WLAN radio access technologies (RAT). The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In LTE/LTE-A network communication systems, the terms evolved Node B (eNodeB or eNB) may be generally used to describe the access points 105. The wireless communications system 100 may be a Heterogeneous LTE/LTE-A network in which different types of access points provide coverage for various geographical regions. For example, each access point 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs 115 with service subscriptions with the network provider. A small cell would generally cover a relatively smaller geographic area and may allow unrestricted access by UEs 115 with service subscriptions with the network provider, for example, and in addition to unrestricted access, may also provide restricted access by UEs 115 having an association with the small cell (e.g., UEs in a closed subscriber group (CSG), UEs for users in the home, and the like). An eNB for a macro cell may be referred to as a macro eNB. An eNB for a small cell may be referred to as a small cell eNB. An eNB may support one or multiple (e.g., two, three, four, and the like) cells.

The core network 130 may communicate with the eNBs or other access points 105 via one or more backhaul links 132 (e.g., S1 interface, etc.). The access points 105 may also communicate with one another, e.g., directly or indirectly via backhaul links 134 (e.g., X2 interface, etc.) and/or via backhaul links 132 (e.g., through core network 130). The wireless communications system 100 may support synchronous or asynchronous operation. For synchronous operation, the access points 105 may have similar frame timing, and transmissions from different access points 105 may be approximately aligned in time. For asynchronous operation, the access points 105 may have different frame timing, and transmissions from different access points 105 may not be aligned in time. Furthermore, transmissions in the first hierarchical layer and second hierarchical layer may or may not be synchronized among access points 105. The techniques described herein may be used for either synchronous or asynchronous operations.

The UEs 115 are dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNodeBs, small cell eNodeBs, relays, and the like. A UE 115 may also be able to communicate over different access networks, such as cellular or other WWAN access networks, or WLAN access networks.

The communication links 125 shown in wireless communications system 100 may include uplink (UL) transmissions from a UE 115 to an access point 105, and/or downlink (DL) transmissions, from an access point 105 to a UE 115. The downlink transmissions may also be called forward link transmissions while the uplink transmissions may also be called reverse link transmissions. The communication links 125 may carry transmissions of each hierarchical layer which, in some examples, may be multiplexed in the communication links 125. The UEs 115 may be configured to collaboratively communicate with multiple access points 105 through, for example, Multiple Input Multiple Output (MIMO), carrier aggregation (CA), Coordinated Multi-Point (CoMP), multiple connectivity (e.g., CA with each of one or more access points 105) or other schemes. MIMO techniques use multiple antennas on the access points 105 and/or multiple antennas on the UEs 115 to transmit multiple data streams. Carrier aggregation may utilize two or more component carriers on a same or different serving cell for data transmission. CoMP may include techniques for coordination of transmission and reception by a number of access points 105 to improve overall transmission quality for UEs 115 as well as increasing network and spectrum utilization.

As mentioned, in some examples, access points 105 and UEs 115 may utilize carrier aggregation to transmit on multiple carriers. In some examples, access points 105 and UEs 115 may concurrently transmit in a first hierarchical layer, within a frame, one or more subframes each having a first subframe type using two or more separate carriers. Each carrier may have a bandwidth of, for example, 20 MHz, although other bandwidths may be utilized. Hybrid UE 115-$a$, and/or second layer UE 115-$b$ may, in certain examples, receive and/or transmit one or more subframes in a second hierarchical layer utilizing a single carrier that has a bandwidth greater than a bandwidth of one or more of the separate carriers. For example, if four separate 20 MHz carriers are used in a carrier aggregation scheme in the first hierarchical layer, a single 80 MHz carrier may be used in the second hierarchical layer. The 80 MHz carrier may occupy a portion of the radio frequency spectrum that at least partially overlaps the radio frequency spectrum used by one or more of the four 20 MHz carriers. In some examples, scalable bandwidth for the second hierarchical layer type may be combined techniques to provide shorter RTTs such as described above, to provide further enhanced data rates.

Each of the different operating modes that may be employed by wireless communications system 100 may operate according to frequency division duplexing (FDD) or time division duplexing (TDD). In some examples, different hierarchical layers may operate according to different TDD or FDD modes. For example, a first hierarchical layer may operate according to FDD while a second hierarchical layer may operate according to TDD. In some examples, OFDMA communications signals may be used in the communication links 125 for LTE downlink transmissions for each hierarchical layer, while single carrier frequency division multiple access (SC-FDMA) communications signals may be used in the communication links 125 for LTE uplink transmissions in each hierarchical layer. Additional details regarding implementation of hierarchical layers in a system such as the wireless communications system 100, as well as other features and functions related to communications in such systems, are provided below with reference to the following figures.

Figure 2:
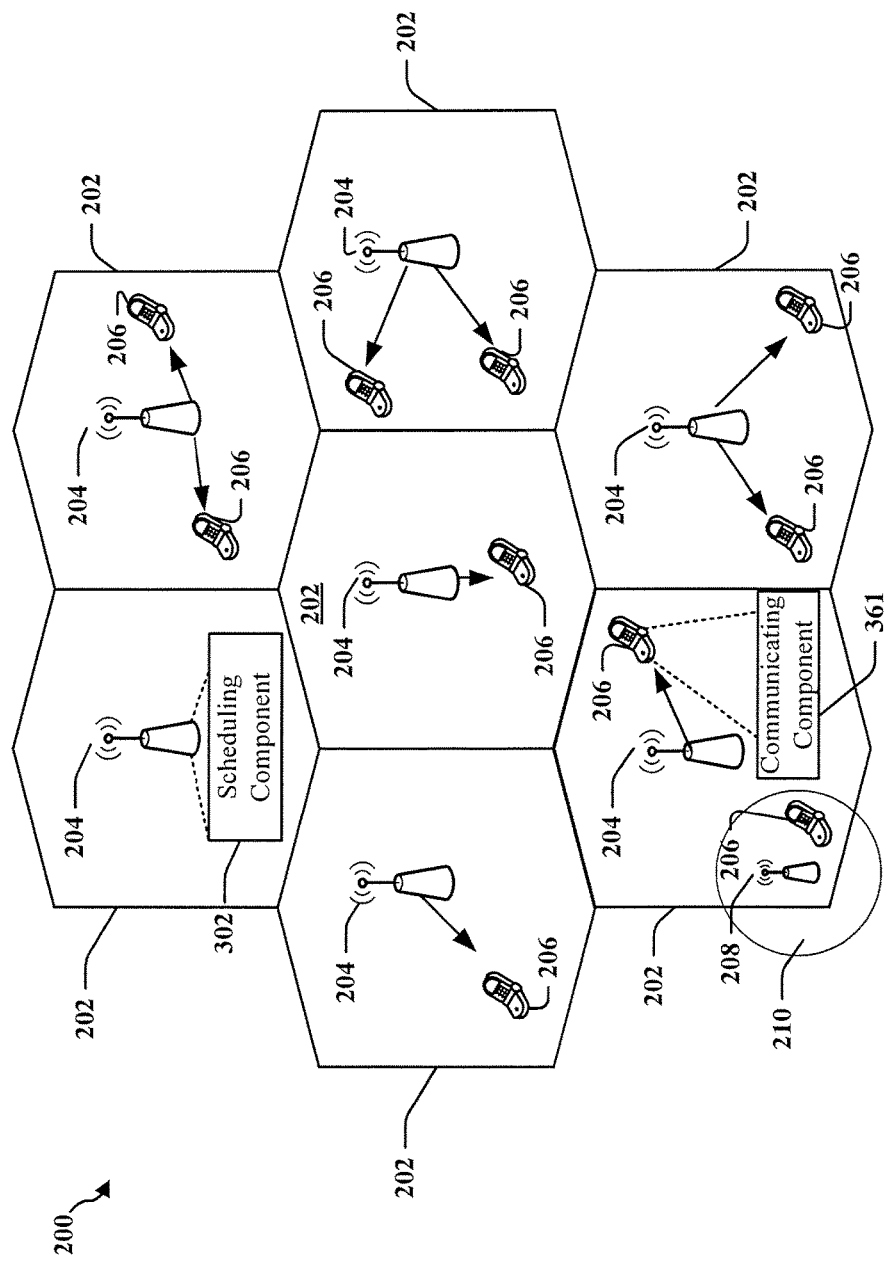
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the core network 130 for all the UEs 206 in the cells 202. In an aspect, eNBs 204 may include a scheduling component 302 configured to communicate resource grants to UEs 206 based on a frame structure, for example but not limited to frame structure 400 (FIG. 4), configured for lower latency communications. Similarly, one or more of UEs 206 may include a communicating component 361 configured to receive, decode, transmit, and operate using the frame structure (e.g., based on resource grants or other indicators received from an access point 105, as described herein). There is no centralized controller shown in this example of an access network 200, but a centralized controller may be used in alternative configurations. The eNBs 204 are responsible for all radio related functions including radio bearer control, admission control, mobility control, scheduling, security, and connectivity to a serving gateway.

The modulation and multiple access scheme employed by the access network 200 may vary depending on the particular telecommunications standard being deployed. In LTE applications, OFDM may be used on the DL and SC-FDMA may be used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
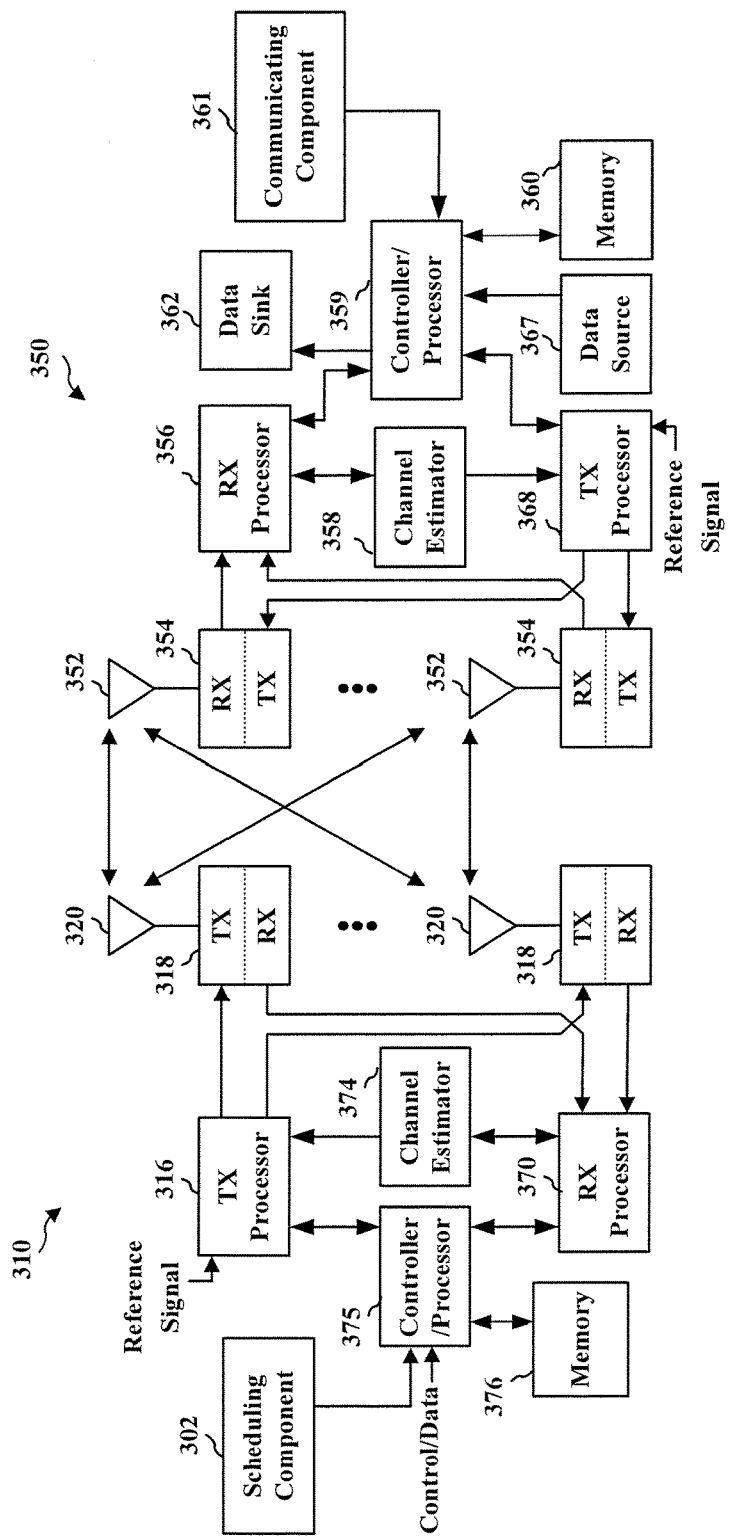
FIG. 3 is a diagram illustrating an example of an evolved Node B and user equipment in an access network.

FIG. 3 is a block diagram of an eNB 310 in communication with a UE 350 in an access network. In the DL, upper layer packets from the core network are provided to a controller/processor 375. The controller/processor 375 implements the functionality of a layer 2 (L2) (e.g., a media access control (MAC) layer). In the DL, the controller/processor 375 provides header compression, ciphering, packet segmentation and reordering, multiplexing between logical and transport channels, and radio resource allocations to the UE 350 based on various priority metrics. The controller/processor 375 is also responsible for HARQ operations, retransmission of lost packets, and signaling to the UE 350.

Figure 4:
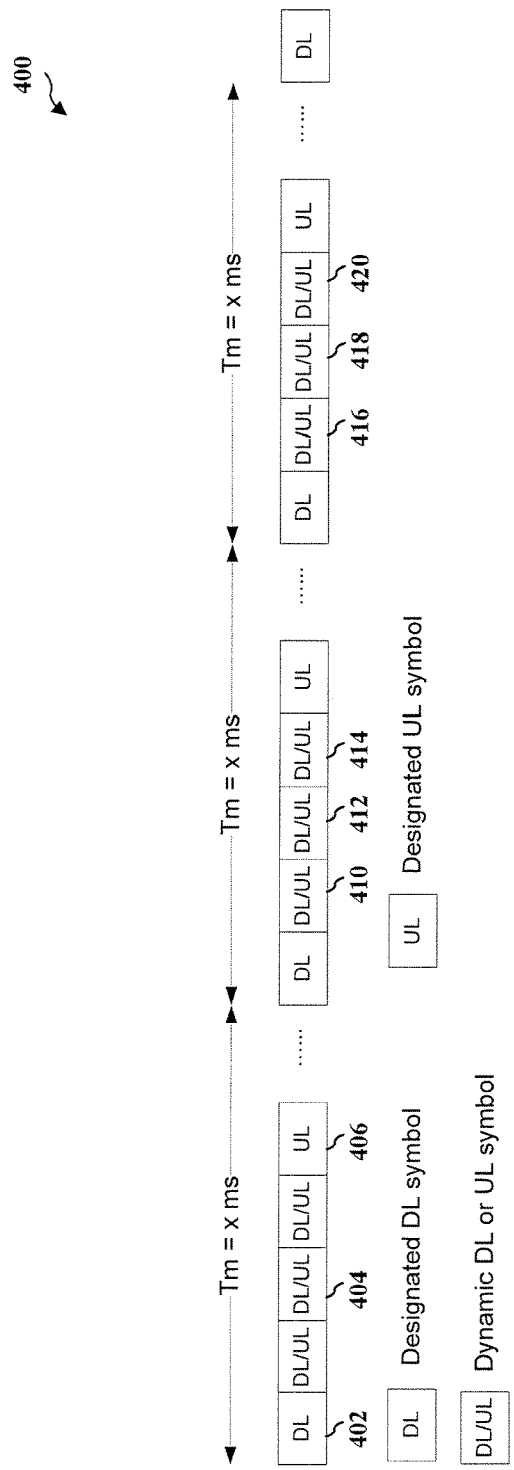
FIG. 4 is a diagram illustrating an example frame structure for dynamically switching configurable transmission time intervals (TTI) between downlink and uplink communications.

The transmit (TX) processor 316 implements various signal processing functions for the L1 layer (i.e., physical layer). The signal processing functions includes coding and interleaving to facilitate forward error correction (FEC) at the UE 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream is then provided to a different antenna 320 via a separate transmitter 318TX. Each transmitter 318TX modulates an RF carrier with a respective spatial stream for transmission. In addition, eNB 310 may include a scheduling component 302 configured to communicate resource grants to UE 350 using a frame structure for lower latency communications over at least one CC, for example but not limited to frame structure 400 (FIG. 4).

At the UE 350, each receiver 354RX receives a signal through its respective antenna 352. Each receiver 354RX recovers information modulated onto an RF carrier and provides the information to the receive (RX) processor 356. The RX processor 356 implements various signal processing functions of the L1 layer. The RX processor 356 performs spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359.

The controller/processor 359 implements the L2 layer. The controller/processor can be associated with a memory 360 that stores program codes and data. The memory 360 may be referred to as a computer-readable medium. In the UL, the controller/processor 359 provides demultiplexing between transport and logical channels, packet reassembly, deciphering, header decompression, control signal processing to recover upper layer packets from the core network. The upper layer packets are then provided to a data sink 362, which represents all the protocol layers above the L2 layer. Various control signals may also be provided to the data sink 362 for layer 3 (L3) (e.g., radio link control (RLC) layer) processing. The controller/processor 359 is also responsible for error detection using an acknowledgement (ACK) and/or negative acknowledgement (NACK) protocol to support HARQ operations. In addition, UE 350 may include a communicating component 361 configured to receive, decode, transmit, and operate using the frame structure for lower latency (e.g., based on resources granted according to the frame structure by scheduling component 302 or other indictors received from eNB 310), as described herein.

In the UL, a data source 367 is used to provide upper layer packets to the controller/processor 359. The data source 367 represents all protocol layers above the L2 layer. Similar to the functionality described in connection with the DL transmission by the eNB 310, the controller/processor 359 implements the L2 layer for the user plane and the control plane by providing header compression, ciphering, packet segmentation and reordering, and multiplexing between logical and transport channels based on radio resource allocations by the eNB 310. The controller/processor 359 is also responsible for HARQ operations, retransmission of lost packets, and signaling to the eNB 310.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 are provided to different antenna 352 via separate transmitters 354TX. Each transmitter 354TX modulates an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370. The RX processor 370 may implement the L1 layer.

The controller/processor 375 implements the L2 layer. The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover upper layer packets from the UE 350. Upper layer packets from the controller/processor 375 may be provided to the core network. The controller/processor 375 is also responsible for error detection using an ACK and/or NACK protocol to support HARQ operations.

FIG. 4 is a diagram illustrating a non-limiting example of a frame structure 400. Frame structure 400 depicts a TDD frame structure having multiple frames of time (Tm) equal to x milliseconds (ms), where x is a positive integer. Each frame can include one or more TTIs configured to be a dedicated downlink TTI 402, a configurable downlink or uplink TTI 404, or a dedicated uplink TTI 406. In an example, a TTI can correspond to a TDD symbol (e.g., an OFDM symbol, a SC-FDM symbol, etc.). For example, designating dedicated downlink TTIs 402 and dedicated uplink TTIs 406 can enable radio resource management (RRM) measurements, synchronization between UEs and eNBs, channel state information (CSI) feedback transmissions, random access channel (RACH) communications, SRs, etc. over the dedicated TTIs. In an example, the dedicated downlink TTIs 402 and dedicated uplink TTIs 406 can be radio resource control (RRC) configured between network nodes (e.g., between a UE and eNB) or otherwise known by the network nodes.

Moreover, for example, the remaining TTIs 404, which are configurable for uplink or downlink communications, can be dynamically switched between uplink and downlink communications. These TTIs 404 are also referred to herein as "configurable TTIs," and may include substantially any TTI that is not dedicated as a downlink or uplink TTI. A serving network node, such as an eNB, can determine one or more parameters related to switching the TTIs 404 between uplink and downlink communications (e.g., a time period, such as a TTI, for which to perform switching, a duration for the switching, etc.) and can indicate the one or more parameters to other network nodes, such as a UE, for communicating with the serving network node, as described further herein. In this regard, a network node receiving a resource grant or other indicator of the one or more parameters from the serving network node can determine whether a given TTI is configured for receiving communications from the serving network node (downlink communications) or transmitting communications to the serving network node (uplink communications). In one example, indicating switching in this regard allows for multiple contiguous (configurable) TTIs to be configured for the same type of communications (downlink or uplink) and may thus allow for burst communications.

Thus, in one example, TTIs 410, 412, 414, and 416 may be configured for downlink communications, and a switch can be indicated to uplink communications for TTIs 418 and 420, as described herein. Similarly, a switch may be indicated back to downlink communications for a configurable TTI following TTI 420. Utilizing configurable TTIs in this regard can allow for dynamic determination of a split between uplink and downlink resources in a given frame, which can be based on communication related parameters at the serving network node such to allow more uplink or downlink resources for improving uplink or downlink communications during the frame.

In one specific example, each TTI in the frame structure 400 can be defined by an OFDM or SC-FDM symbol and may be of a length shorter than that the 1 millisecond subframe TTIs of LTE, such to provide lower latency communications. Thus, in an example, a frame may correspond to a subframe that includes a plurality of TTIs, a frame that includes a plurality of subframes that each include a plurality of TTIs, etc. The dynamic switching between uplink and downlink TTIs may provide for an adaptable frame to handle a desired distribution of uplink and downlink communications, which can allow for achieving certain uplink/downlink latencies.

Referring to FIGS. 5-9, aspects are depicted with reference to one or more components and one or more methods that may perform the actions or functions described herein. In an aspect, the term "component" as used herein may be one of the parts that make up a system, may be hardware or software or some combination thereof, and may be divided into other components. Although the operations described below in FIGS. 6-9 are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

Figure 5:
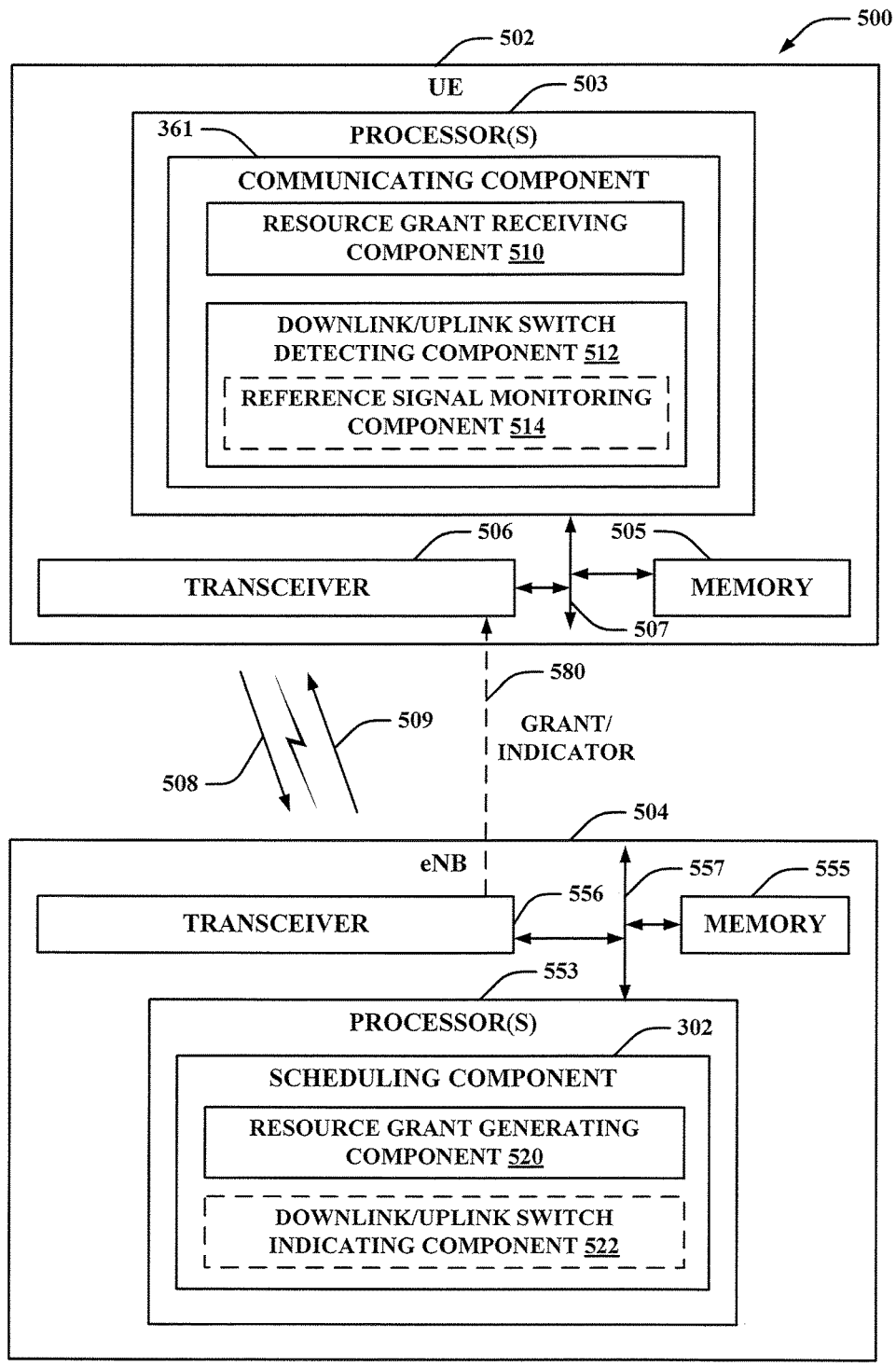
FIG. 5 is a diagram illustrating an example system for determining when configurable TTIs are switched between uplink and downlink communications in accordance with aspects described herein.

FIG. 5 illustrates an example system 500 for communicating between nodes in a wireless network based on a frame structure that facilitate dynamic switching of downlink/uplink TTIs. System 500 includes a UE 502 that communicates with an eNB 504 to access a wireless network, examples of which are described in FIGS. 1-3, above. In an aspect, eNB 504 and UE 502 may have established one or more downlink channels over which to communicate via downlink signals 509, which can be transmitted by eNB 504 (e.g., via transceiver 556) and received by UE 502 (e.g., via transceiver 506) for communicating control and/or data messages (e.g., in signaling) from the eNB 504 to the UE 502 over configured communication resources. Moreover, for example, eNB 504 and UE 502 may have established one or more uplink channels over which to communicate via uplink signals 508, which can be transmitted by UE 502 (e.g., via transceiver 506) and received by eNB 504 (e.g., via transceiver 556) for communicating control and/or data messages (e.g., in signaling) from the UE 502 to the eNB 504 over configured communication resources. As described further herein, for example, eNB 504 may communicate a resource grant or other indicator 580 that can indicate one or more parameters regarding switching from downlink to uplink communications (or vice versa) in a TTI.

In an aspect, UE 502 may include one or more processors 503 and/or a memory 505 that may be communicatively coupled, e.g., via one or more buses 507, and may operate in conjunction with or otherwise implement a communicating component 361 for communicating with eNB 504 such to transmit uplink signals 508 thereto and/or receive downlink signals 509 therefrom according to a frame structure having TTIs configurable for uplink or downlink communications. For example, the various operations related to communicating component 361 may be implemented or otherwise executed by one or more processors 503 and, in an aspect, can be executed by a single processor, while in other aspects, different ones of the operations may be executed by a combination of two or more different processors. For example, in an aspect, the one or more processors 503 may include any one or any combination of a modem processor, or a baseband processor, or a digital signal processor, or an application specific integrated circuit (ASIC), or a transmit processor, receive processor, or a transceiver processor associated with transceiver 506. Further, for example, the memory 505 may be a non-transitory computer-readable medium that includes, but is not limited to, random access memory (RAM), read only memory (ROM), programmable ROM (PROM), erasable PROM (EPROM), electrically erasable PROM (EEPROM), a magnetic storage device (e.g., hard disk, floppy disk, magnetic strip), an optical disk (e.g., compact disk (CD), digital versatile disk (DVD)), a smart card, a flash memory device (e.g., card, stick, key drive), a register, a removable disk, and any other suitable medium for storing software and/or computer-readable code or instructions that may be accessed and read by a computer or one or more processors 503. Moreover, memory 505 or computer-readable storage medium may be resident in the one or more processors 503, external to the one or more processors 503, distributed across multiple entities including the one or more processors 503, etc.

In particular, the one or more processors 503 and/or memory 505 may execute actions or operations defined by communicating component 361 or its subcomponents. For instance, the one or more processors 503 and/or memory 505 may execute actions or operations defined by a resource grant receiving component 510 for obtaining resource grants from eNB 504, which may include or otherwise implicitly indicate one or more TTIs configured for uplink communications or downlink communications. In an aspect, for example, resource grant receiving component 510 may include hardware (e.g., one or more processor modules of the one or more processors 503) and/or computer-readable code or instructions stored in memory 505 and executable by at least one of the one or more processors 503 to perform the specially configured resource grant receiving and/or processing operations described herein. Further, for instance, the one or more processors 503 and/or memory 505 may execute actions or operations defined by a downlink/uplink switch detecting component 512 for determining one or more configurable TTIs where communications with eNB 504 switch from downlink to uplink and/or vice versa. In an aspect, for example, downlink/uplink switch detecting component 512 may include hardware (e.g., one or more processor modules of the one or more processors 503) and/or computer-readable code or instructions stored in memory 505 and executable by at least one of the one or more processors 503 to perform the specially configured downlink/uplink switch detecting operations described herein. Further, for instance, the one or more processors 503 and/or memory 505 may optionally execute actions or operations defined by a reference signal monitoring component 514 for monitoring communication resources for one or more reference signals, which may be used to determine whether communications in a configurable TTI were switched to downlink communications from uplink communications in a previous TTI and/or vice versa. In an aspect, for example, reference signal monitoring component 514 may include hardware (e.g., one or more processor modules of the one or more processors 503) and/or computer-readable code or instructions stored in memory 505 and executable by at least one of the one or more processors 503 to perform the specially configured reference signal monitoring operations described herein.

Similarly, in an aspect, eNB 504 may include one or more processors 553 and/or a memory 555 that may be communicatively coupled, e.g., via one or more buses 557, and may operate in conjunction with or otherwise implement a one or more of a scheduling component 302 for communicating one or more resource grants or other indicators 580 to a UE 502, which may indicate one or more parameters regarding switching from downlink to uplink communications, and/or vice versa, in one or more TTIs. For example, the various functions related to scheduling component 302 may be implemented or otherwise executed by one or more processors 553 and, in an aspect, can be executed by a single processor, while in other aspects, different ones of the functions may be executed by a combination of two or more different processors, as described above. It is to be appreciated, in one example, that the one or more processors 553 and/or memory 555 may be configured as described in examples above with respect to the one or more processors 503 and/or memory 505 of UE 502.

In an example, the one or more processors 553 and/or memory 555 may execute actions or operations defined by scheduling component 302 or its subcomponents. For instance, the one or more processors 553 and/or memory 555 may execute actions or operations defined by a resource grant generating component 520 for generating one or more resource grants and/or other indicators 580 for the UE 502, where the resource grant and/or other indicator 580 may indicate one or more parameters regarding a TTI during which communications are switched from downlink to uplink, and/or vice versa. In an aspect, for example, resource grant generating component 520 may include hardware (e.g., one or more processor modules of the one or more processors 553) and/or computer-readable code or instructions stored in memory 555 and executable by at least one of the one or more processors 553 to perform the specially configured resource grant generating operations described herein. Further, for instance, the one or more processors 553 and/or memory 555 may execute actions or operations defined by an optional downlink/uplink switch indicating component 522 for indicating, via the resource grant or other indicators 580, one or more parameters regarding a TTI during which communications are switched from downlink to uplink, and/or vice versa. In an aspect, for example, downlink/uplink switch indicating component 522 may include hardware (e.g., one or more processor modules of the one or more processors 553) and/or computer-readable code or instructions stored in memory 555 and executable by at least one of the one or more processors 553 to perform the specially configured downlink/uplink switch indicating operations described herein.

It is to be appreciated that transceivers 506, 556 may be configured to transmit and receive wireless signals through one or more antennas, an RF front end, one or more transmitters, and one or more receivers. In an aspect, transceivers 506, 556 may be tuned to operate at specified frequencies such that UE 502 and/or eNB 504 can communicate at a certain frequency. In an aspect, the one or more processors 503 may configure transceiver 506 and/or one or more processors 553 may configure transceiver 556 to operate at a specified frequency and power level based on a configuration, a communication protocol, etc. to communicate uplink signals 508 and/or downlink signals 509, respectively, over related uplink or downlink communication channels.

In an aspect, transceivers 506, 556 can operate in multiple bands (e.g., using a multiband-multimode modem, not shown) such to process digital data sent and received using transceivers 506, 556. In an aspect, transceivers 506, 556 can be multiband and be configured to support multiple frequency bands for a specific communications protocol. In an aspect, transceivers 506, 556 can be configured to support multiple operating networks and communications protocols. Thus, for example, transceivers 506, 556 may enable transmission and/or reception of signals based on a specified modem configuration.

Figure 6:
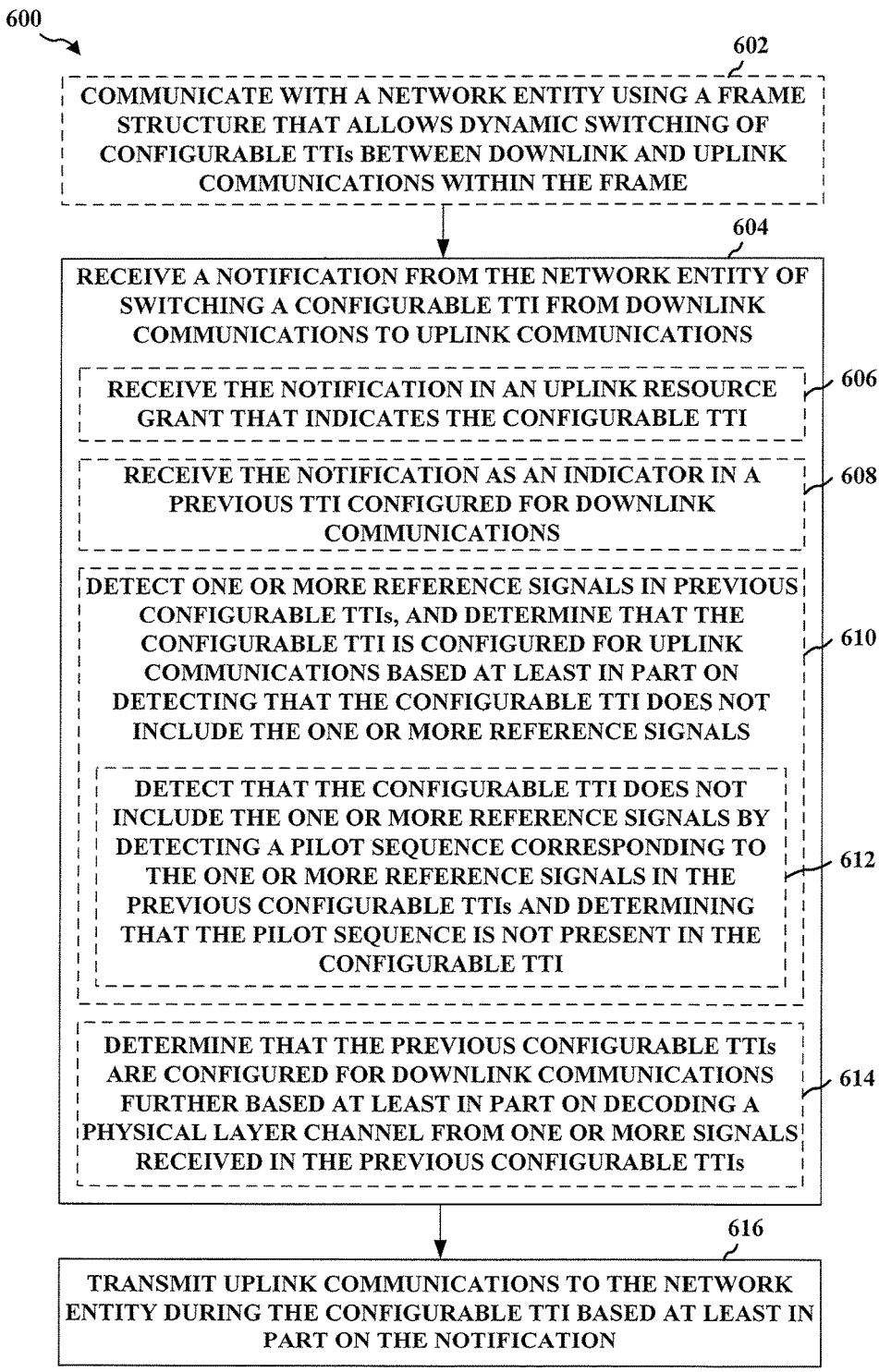
FIGS. 6 and 7 are flow charts of example methods of transmitting uplink communications based on detecting switching of configurable TTIs from downlink to uplink communications.

FIG. 6 illustrates an example method 600 for communicating with a network entity (e.g., by a UE) based on a frame structure that facilitates dynamic switching between TTIs configured for downlink and uplink communications. At Block 602, a UE may optionally communicate with a network entity using a frame structure that allows dynamic switching of configurable TTIs between downlink and uplink communications within the frame. Communicating component 361 of UE 502 (FIG. 5) can communicate with the network entity (e.g., eNB 504) using a frame structure that allows dynamic switching of configurable TTIs between downlink and uplink communications within the frame. In one example, resource grant generating component 520 can configure UE 502 with resources designated based on the frame structure, and resource grant receiving component 510 can receive the resources for communicating with eNB 504 via communicating component 361. In an example, the frame structure can be similar to frame structure 400 (FIG. 4) including dedicated downlink TTIs, TTIs configurable for either uplink or downlink communications, and/or dedicated uplink TTIs. Thus, for example, resource grant generating component 520 may generate, and resource grant receiving component 510 may receive, a downlink resource grant indicating downlink resources in corresponding TTIs that are configurable as downlink or uplink resources or in TTIs that are dedicated downlink TTIs, an uplink resource grant indicating uplink resources in corresponding TTIs that are configurable as downlink or uplink resources or in TTIs that are dedicated uplink TTIs, etc.

For example, UE 502 and eNB 504 may communicate in downlink or uplink bursts such that the TTIs configurable for downlink or uplink communications are configured for downlink communications for one or more TTIs, and then for uplink communications for one or more TTIs, and then back to downlink, and so on. As described, in an example, eNB 504 can define switching between downlink and uplink communications in these TTIs such to achieve a desired uplink or downlink latency, which may include defining the switching based at least in part on a load on eNB 504, a buffer status, quality-of-service, subscription level, etc. of UE 502, and/or similar parameters that can indicate a demand for communication resources. In this regard, as described further herein, eNB 504 may indicate one or more parameters regarding a switch in the configurable TTIs from downlink to uplink and/or vice versa to UE 502 and/or one or more other UEs. It is to be appreciated, in one example however, that the UE 502 and/or one or more other UEs need not communicate with the network entity over granted resources to receive information regarding switching of configurable TTIs from downlink to uplink communications, and/or vice versa, as described herein.

Accordingly, at Block 604, a UE may receive a notification from the network entity of switching a configurable TTI from downlink communications to uplink communications. Downlink/uplink switch detecting component 512 can receive the notification from the network entity of switching a configurable TTI from downlink communications to uplink communications. It is to be appreciated that various notifications of switching a configurable TTI from downlink to uplink communications can be employed in this regard. In one example, in receiving the notification at Block 604, at Block 606 the UE may optionally receive the notification in an uplink resource grant that indicates the configurable TTI. Thus, for example, where UE 502 is scheduled resources by eNB 504, resource grant generating component 520 can generate an uplink resource grant 580 for UE 502 related to a given TTI, and scheduling component 302 can transmit the uplink resource grant 580 (e.g., via transceiver 556) to UE 502. In this example, resource grant receiving component 510 can receive the notification in an uplink resource grant 580 received from eNB 504 (e.g., via transceiver 506) that indicates the configurable TTI. For example, downlink/ uplink switch detecting component 512 can determine the downlink to uplink switch in a given TTI based at least in part on a TTI or similar timing information indicated in the uplink resource grant. In one example, downlink/uplink switch detecting component 512 can determine the downlink to uplink switch to occur in the TTI corresponding to the granted uplink resources, a number of TTIs before the granted uplink resources, a number of TTIs after the TTI in which the uplink resource grant is received, a TTI indicated as the switching TTI in the resource grant, etc.

In another example (e.g., where UE 502 is not scheduled by eNB 504 or in any case), downlink/uplink switch indicating component 522 can indicate a switch from downlink to uplink communications in a configurable TTI using an indicator. Thus, for example, in receiving the notification at Block 604, at Block 608, the UE may optionally receive the notification as an indicator in a previous TTI configured for downlink communications. For example, downlink/uplink switch detecting component 512 may receive the notification as an indicator 580 in the previous TTI configured for downlink communications (e.g., a heads-up bit that can be transmitted in a downlink signal 509, using a downlink channel, etc.), in which case downlink/uplink switch detecting component 512 can receive the bit or other indicator 580 (e.g., via transceiver 506), and can determine the configurable TTI as an upcoming TTI where communications are switched to uplink communications. The indicator may indicate at least one of the switch occurring in the next TTI, a number of TTIs in advance where the switch will occur (e.g., a known or configured number of TTIs after a heads-up bit is received or an explicit number of TTIs specified in the indicator), an explicit TTI where the switch will occur where the TTIs can be identified (e.g., by frame number, subframe number, etc.), and/or the like. For example, downlink/uplink switch detecting component 512 can monitor communications from eNB 504 to detect the indicator.

For instance, where UE 502 is scheduled by eNB 504, downlink/uplink switch detecting component 512 can monitor communications from eNB 504 following receipt of a downlink grant or other indication of a downlink grant duration. Otherwise, UE 502 can monitor communications from eNB 504 at substantially any configurable TTI (and/or a dedicated downlink TTI) until the indication of switching (e.g., an uplink resource grant or other indicator 580) is received from eNB 504.

In addition, for example, the resource grant or other indicator 580 may include one or more parameters indicating a duration of the uplink TTIs until the configurable TTIs are again switched to downlink communications. For example, the one or more parameters may correspond to a number of TTIs indicated in the resource grant or other indicator 580 that relate to a burst length of the uplink burst. In one example, a non-zero value for the number of TTIs may also be the parameter that indicates switching to uplink communications in a next TTI. In any case, downlink/uplink switch detecting component 512 can detect the switch to uplink communications for the duration, and at the end of the duration may determine a switch back to downlink communications, as described further herein.

In additional examples, the eNB 504 may not communicate an explicit notification of switching the TTIs between downlink and uplink communications, and/or vice versa, but rather communications from eNB 504 may implicitly notify of switching. Accordingly, downlink/uplink switch detecting component 512 may attempt to blindly detect whether a given TTI is configured for downlink or uplink communications. For example, in receiving the notification at Block 604, at Block 610, the UE may optionally detect one or more reference signals in previous configurable TTIs, and determining that the configurable TTI is configured for uplink communications based at least in part on detecting that the configurable TTI does not include the one or more reference signals. For example, reference signal monitoring component 514 can detect the one or more reference signals in the previous configurable TTIs, and downlink/uplink switch detecting component 512 can determine that the configurable TTI is configured for uplink communications based at least in part on detecting that the configurable TTI does not include the one or more reference signals.

In one example, in detecting that the configurable TTI does not include the one or more reference signals at Block 610, at Block 612, the UE may optionally detect that the configurable TTI does not include the one or more reference signals by detecting a pilot sequence corresponding to the one or more reference signals in the previous configurable TTIs and determining that the pilot sequence is not present in the configurable TTI. Reference signal monitoring component 514 can detect the pilot sequence corresponding to the one or more reference signals in the previous configurable TTIs, and can determine whether the pilot sequence is present in the configurable TTI.

In one example, eNB 504 can transmit reference signals, such as cell-specific reference signal (CRS), according to the pilot sequence. eNB 504 can transmit the reference signals using a dense pilot signal, which may include transmitting a reference signal with a dense pilot configuration (e.g., using substantially all available bandwidth, or at least more than a frequency subcarrier, to transmit the reference signal in a TTI). This can facilitate improved receipt and detection of the pilot signal by the UE 502. In another example, eNB 504 may transmit the reference signal using a relatively sparse pilot configuration (e.g., a pilot configuration normally defined for a RAT, such as LTE, which may use less bandwidth than a dense pilot configuration). In either case, the reference signals transmitted as a pilot signal in this regard can be used for performing channel estimation to coherently detect subsequent transmissions of the reference signal or related pilot sequences. In this example, reference signal monitoring component 514 can monitor signals in the previous configurable TTIs, and can observe the reference signal transmitted as a pilot signal. Reference signal monitoring component 514 can accordingly use the reference signal to perform channel estimation, and the channel estimates obtained from the previous configurable TTIs may be used to aid the detection of reference signals in subsequent TTIs to determine that a subsequent TTI is a downlink TTI based on detecting a related (e.g., similar) pilot sequence in the subsequent TTI.

In this example, reference signal monitoring component 514 can monitor the channel for reference signals in the previous configurable TTIs configured for downlink communications (or in dedicated downlink TTIs), and can observe or otherwise determine the pilot sequence of reference signals (e.g., CRS) transmitted by eNB 504. Reference signal monitoring component 514 can accordingly attempt to coherently detect the reference signal (e.g., CRS) in subsequent downlink TTIs, such as the configurable TTI, based on the detected pilot sequence. Where reference signal monitoring component 514 does not encounter reference signals having the determined pilot sequence in the configurable TTI, this may be a notification that the configurable TTIs have switched from downlink to uplink communications, and downlink/uplink switch detecting component 512 may determine that the communications have been switched from downlink to uplink communications in the configurable TTI (or before).

It is to be appreciated, in another example, that the reference signal monitoring component 514 may not rely on the channel estimates from the previous configurable TTIs but instead rely on the current TTI to determine the pilot sequence, thus non-coherently detecting reference signals received in downlink signals 509 from eNB 504. For example, reference signal monitoring component 514 may non-coherently detect the reference signals where the previous configurable TTIs were not downlink TTIs, or otherwise where coherent detection is not used or supported (e.g., which can conserve memory that may be otherwise used to store information regarding the previously detected reference signals). In either case, as described, downlink/uplink switch detecting component 512 can detect that a TTI is configured for downlink communications based at least in part on detecting the reference signals in the TTI. Similarly, in an example, downlink/uplink switch detecting component 512 can detect that a TTI is not configured for downlink communications (e.g., is configured for uplink communications) based at least in part on not detecting the reference signals or related pilot sequence in the TTI. Thus, downlink/uplink switch detecting component 512 can receive the notification of switching the configurable TTI based on determining (non-coherently) whether the TTI includes one or more reference signals associated with downlink communications.

In addition, in an example, in receiving the notification at Block 604, at Block 614, the UE may optionally determine that the previous configurable TTIs are configured for downlink communications further based at least in part on decoding a physical layer channel from one or more signals received in the previous configurable TTI. Downlink/uplink switch detecting component 512 can determine that the previous configurable TTIs are configured for downlink communications further based at least in part on decoding a physical layer channel from one or more signals received in the previous configurable TTI. This can have occurred before detecting that the configurable TTI does not include the one or more reference signals at Block 610, such to implicitly receive the notification that the configurable TTIs are switched from downlink to uplink communications. In another example, downlink/uplink switch detecting component 512 can additionally or alternatively attempt to decode a known physical layer channel in signals received from eNB 504 to confirm that the previous configurable TTIs were configured for downlink communications, as described further herein. In one example, downlink/uplink switch detecting component 512 can attempt to decode the physical layer channel, such as a physical control format indicator channel (PCFICH), based on the received CRS to confirm that the previous configurable TTIs corresponded to downlink communications.

In any case, based on receiving the explicit or implicit notification of switching the configurable TTIs from downlink to uplink communications, communicating component 361 can switch the transceiver 506 or related resources (e.g., an antenna, one or more processors 503 that can operate the antenna such as a modem processor, etc.) from a receive mode to a transmit mode. In another example, communicating component 361 can enter sleep mode, as described herein, which may include deactivating one or more components of the transceiver 506, a related processor (e.g., a modem processor), an antenna, etc. for a period of time based on detecting the configurable TTI is configured for uplink communications. Where the UE 502 is not scheduled to communicate with eNB 504, for example, this can conserve resources and lower power consumption of the UE 502.

At Block 616, the UE can transmit uplink communications to the network entity during the configurable TTI based at least in part on the notification. For example, with the transceiver 506 in transmit mode, as described, communicating component 361 can transmit uplink communications to the network entity (e.g., eNB 504) during the configurable TTI based at least in part on the notification. For example, a first TTI in an uplink data burst (e.g., and/or dedicated uplink TTIs) can be used by scheduled and/or non-scheduled UEs 502 for transmitting uplink control information to eNB 504, such as CSI reports, ACK/NACK feedback, SRs, etc. Accordingly, in this example, scheduling for transmitting at least some of the uplink control information may not be required of eNB 504, as the UE 502 can detect the switch of the configurable TTI to uplink communications (e.g., based on a resource grant or other indicator 580, as described above) and can accordingly transmit the control data in the configurable TTI. This can additionally conserve resources and reduce latency as explicit resource granting for control data communications may not be needed. In this example, however, it is to be appreciated that control channel resources may be semi-statically allocated to the UE 502 for communicating control data in the first uplink TTIs (e.g., in an initial resource grant from the eNB 504, etc.), but may not be needed for each transmission of control data in a first uplink TTI of an uplink burst.

In addition, where the switch to uplink communications is part of a resource grant received by UE 502, communicating component 361 can transmit additional uplink communications to UE 502 in the uplink data burst. For example, communicating component 361 can continue transmitting to the eNB 504 until the uplink data burst has ended (e.g., until the eNB 504 indicates switching configurable TTIs from uplink to downlink communications, whether by an explicit indication from the eNB 504, an indication of a number of TTIs related to the uplink data burst until switching to downlink communications, detecting a switch based on receiving one or more downlink signals from the eNB 504, etc., as described further herein).

Figure 7:
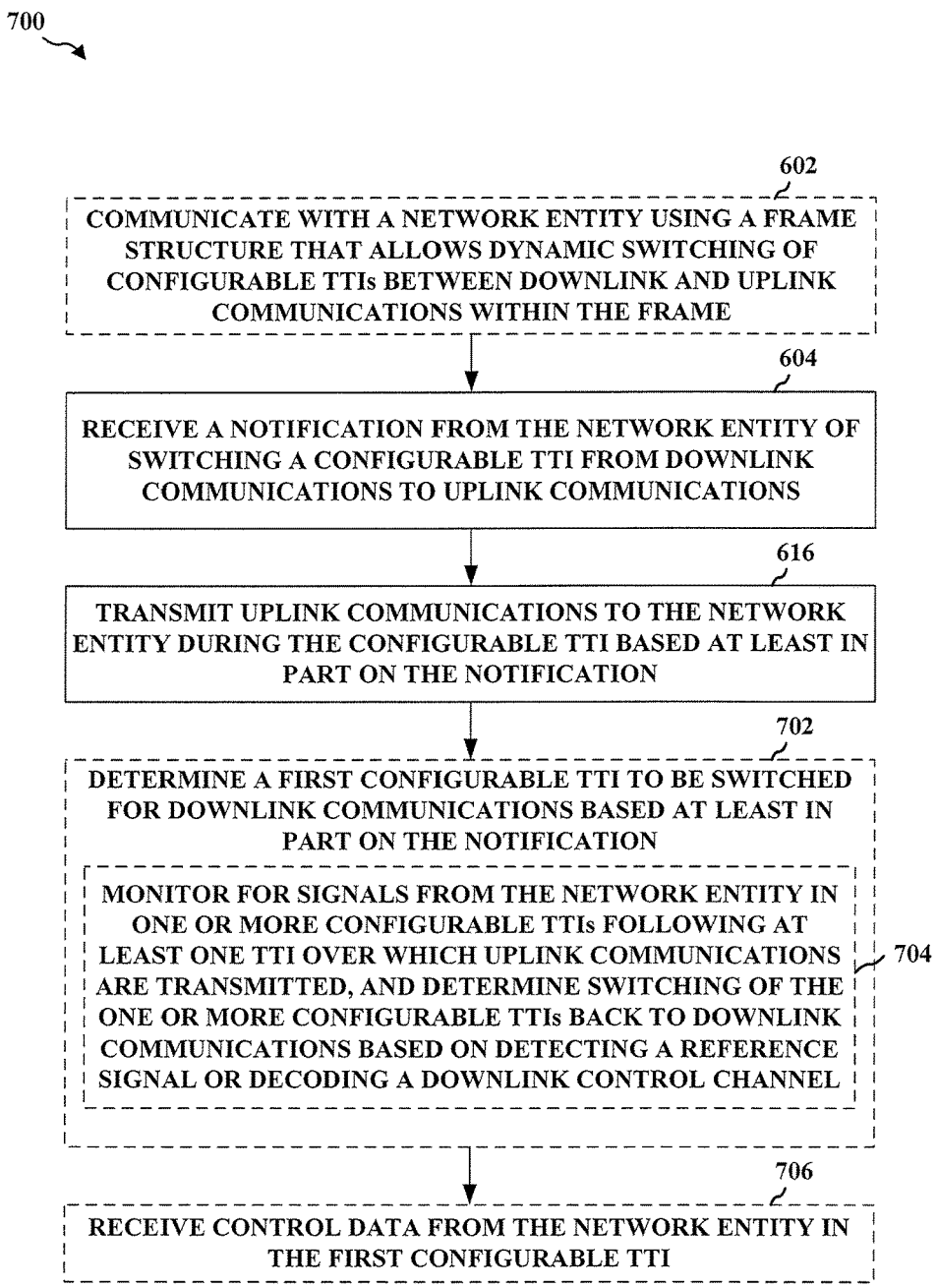

FIG. 7 also illustrates an example method 700 for communicating with a network entity (e.g., by a UE) based on a frame structure that facilitates dynamic switching between TTIs configured for downlink and uplink communications. At Block 602, the UE may optionally communicate with a network entity using a frame structure that allows dynamic switching of configurable TTIs between downlink and uplink communications within the frame, as described with respect to FIG. 6 above. At Block 604, the UE may receive a notification from the network entity of switching a configurable TTI from downlink communications to uplink communications, as described with respect to FIG. 6 above. At Block 616, the UE may transmit uplink communications to the network entity during the configurable TTI based at least in part on the notification, as described with respect to FIG. 6 above.

At Block 702, the UE may optionally determine a first configurable TTI to be switched for downlink communications based at least in part on the notification. For example, downlink/uplink switch detecting component 512 can determine the first configurable TTI to be switched for downlink communications based at least in part on the notification. As described, downlink/uplink switch indicating component 522 may indicate a switch in the configurable TTIs from uplink to downlink using one or more indicators, which can be the same indicator as used to provide the notification of switching from downlink to uplink communications as received by communicating component 361 (e.g., at Block 604). For example, resource grant generating component 520 can specify a burst length of the uplink resource grant provided to UE 502 (e.g., where the burst length can correspond to a number of TTIs), an index of the TTI during which communications will be switched back to downlink, etc. In another example, downlink/uplink switch indicating component 522 may generate the other indicator of the downlink to uplink switch (e.g., the TTI carrying the heads-up bit) to also include one or more parameters (e.g., in L1 signaling) indicating when a switch back to downlink communications will occur (e.g., a burst length of the uplink burst, an index of the TTI during which the communications will be switched back to downlink, etc.). Accordingly, in either case, downlink/uplink switch detecting component 512 can detect the switch in the configurable TTIs from uplink to downlink communications (e.g., for a downlink burst) based on one or more parameters received in the uplink resource grant or other indicator 580.

In another example, scheduling component 302 may begin transmitting downlink signals 509 without necessarily indicating the switch to downlink to UE 502 or one or more other UEs. Thus, for example, downlink/uplink switch detecting component 512 can detect the switch based on receiving the one or more downlink signals, as described further herein. Accordingly, in an example, in determining the first configurable TTI to be switched for downlink communications at Block 702, at Block 704, the UE may monitor for signals from the network entity in one or more configurable TTIs following at least one TTI over which uplink communications are transmitted, and determining switching of the one or more configurable TTIs back to downlink communications based on detecting a reference signal or decoding a downlink control channel. For example, reference signal monitoring component 514 can monitor for signals from the network entity (e.g., reference signals from eNB 504) in one or more configurable TTIs following the at least one TTI over which uplink communications are transmitted (e.g., by UE 502), and can determine switching of the one or more configurable TTIs back to downlink communications based on detecting a reference signal or decoding a downlink control channel.

For example, where downlink reference signals are detected from eNB 504 following a determined switch from downlink to uplink communications, this may indicate a switch back from uplink to downlink communications in the configurable TTIs (e.g., where the downlink reference signal is received in a configurable TTI and/or not received in a dedicated downlink TTI). For example, where UE 502 is scheduled by eNB 504 but does not receive an indication of when the switch to downlink communications occurs, communicating component 361 can transmit its uplink data information over one or more uplink TTIs according to its uplink resource grant received from eNB 504, and then reference signal monitoring component 514 can begin monitoring for downlink reference signals from eNB 504 to determine when the configurable TTIs are switched from uplink back to downlink communications. This may include communicating component 361 switching the transceiver 506 to a receive mode to monitor for the reference signals following transmitting the uplink data information. In another example, where UE 502 is not scheduled by eNB 504 at all, communicating component 361 can possibly transmit uplink control information over the first uplink TTI in the indicated uplink data burst, and then reference signal monitoring component 514 can begin monitoring for downlink reference signals from eNB 504 to determine when the configurable TTIs are switched from uplink back to downlink communications. Again, this may include communicating component 361 switching the transceiver 506 to a receive mode to monitor for the reference signals after transmitting uplink control information or otherwise.

In one example, monitoring for signals from the eNB 504 in this regard can facilitate blindly detecting whether a given TTI is downlink or uplink. As described above, eNB 504 can transmit reference signals, such as CRS, according to a pilot sequence. In this example, monitoring for signals at Block 704 may include monitoring for signals having a known or learned pilot sequence. In one example, reference signal monitoring component 514 can observe reference signals received from eNB 504 in previous downlink TTIs, and can detect the pilot sequence utilized (e.g., based on a channel estimate of the reference signals received from eNB 504). Reference signal monitoring component 514 can accordingly attempt to detect the reference signals in subsequent downlink TTIs based on the detected pilot sequence. In addition, in an example, reference signal monitoring component 514 can attempt to decode a known physical layer channel in subsequent received signals based on the received reference signals (e.g., CRS), such as a downlink control channel (e.g., physical downlink control channel (PDCCH), physical control format indicator channel (PCFICH) or a similar channel) to confirm that the configurable TTI is switched for downlink communications.

In any case, where the first configurable TTI to be switched is determined at Block 702, communicating component 361 can switch transceiver 506, as described, to a receive mode to receive downlink signals 509 from eNB 504. Thus, at Block 706, the UE can optionally receive control data from the network entity in the first configurable TTI. Communicating component 361 can receive the control data from the network entity (e.g., eNB 504) in the first configurable TTI. As described, this can include receiving downlink signals 509 from eNB 504, which may include the control data from eNB 504. In one example, the control data may indicate a resource grant for UE 502 and/or an indication of when the TTIs will be switched back for uplink communications. In any case, for example, communicating component 361 can continue to receive downlink signals 509 in one or more TTIs, and method 700 can accordingly continue to 604 to receive another notification of switching a configurable TTI from downlink communications to uplink communications, and so on. In other words, downlink/uplink switch detecting component 512 can continue to detect switching from downlink to uplink communications in the configurable TTIs and from uplink to downlink communications to synchronize communications with eNB 504 using the techniques described above.

Figure 8:
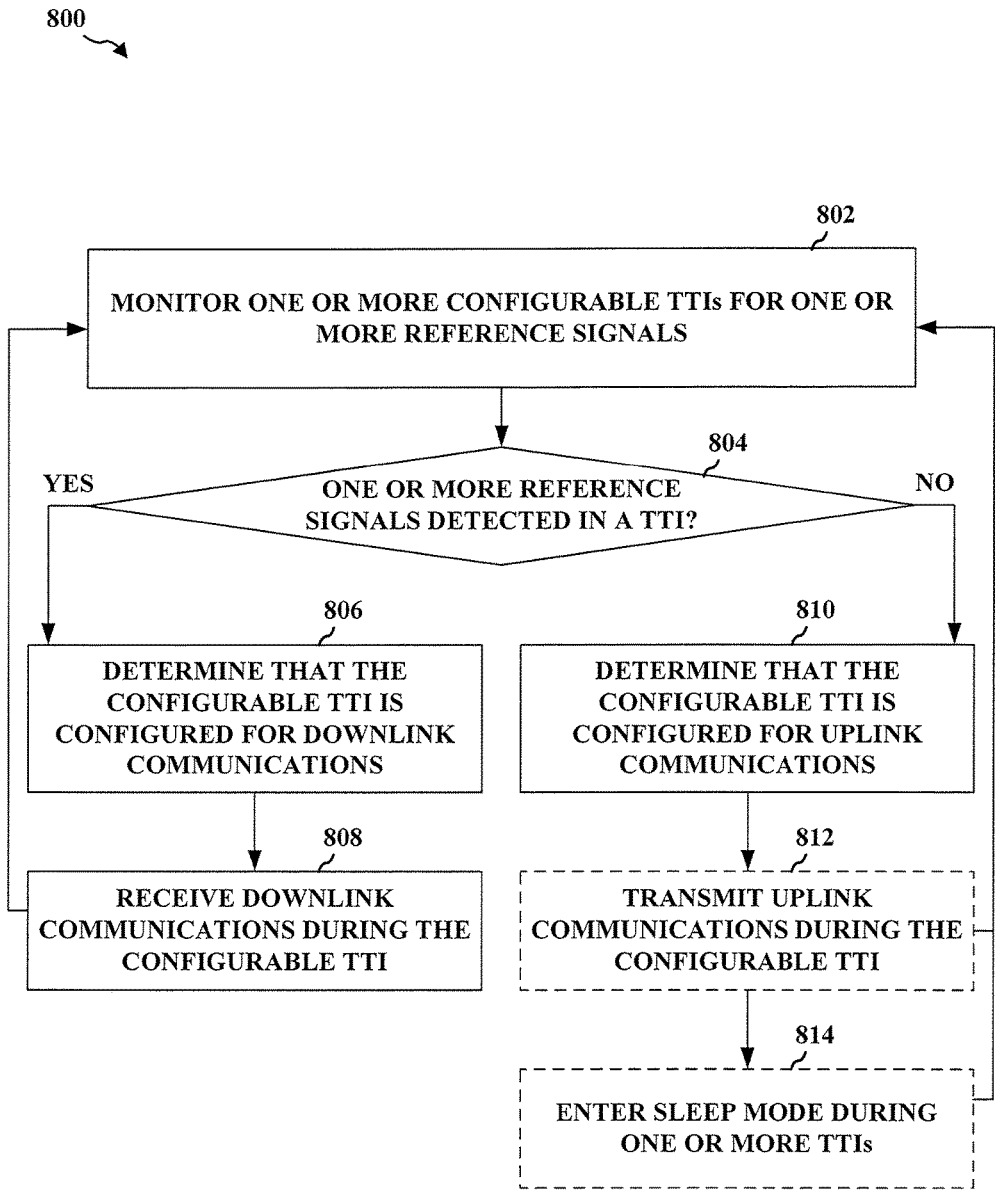
FIG. 8 is a flow chart of an example method of determining whether a configurable TTI is configured for downlink or uplink communications.

FIG. 8 illustrates an example method 800 for determining (e.g., by a UE) whether a configurable TTI is configured for uplink or downlink communications. At Block 802, the UE may monitor one or more configurable TTIs for one or more reference signals. Reference signal monitoring component 514 can monitor the one or more configurable TTIs for the one or more reference signals. As described, for example, reference signal monitoring component 514 can monitor for a pilot signal and/or one or more pilot sequences known to correspond to a reference signal. In one example, reference signal monitoring component 514 can receive a pilot signal (e.g., from eNB 504) in a previous TTI (e.g., according to a dense or sparse pilot configuration), and can utilize the pilot signal to detect similar reference signals received in subsequent TTIs. Reference signal monitoring component 514 can thus determine a pilot sequence for one or more reference signals transmitted by eNB 504, and can utilize the pilot sequence to attempt coherent detection of one or more reference signals in subsequent configurable TTIs. In another example, reference signal monitoring component 514 can non-coherently detect reference signals in a TTI without detecting similar reference signals in previous TTIs.

At Block 804, the UE may determine whether one or more reference signals are detected in a TTI. Reference signal monitoring component 514 can determine whether one or more reference signals are detected in the TTI. As described, this can be based on verifying a pilot sequence of the reference signals, performing channel estimation to determine the signals are reference signals, etc.

Where one or more reference signals are detected in the TTI at Block 804, at Block 806 the UE may determine that the configurable TTI is configured for downlink communications. Downlink/uplink switch detecting component 512 can determine that the TTI is configured for downlink communications where the one or more reference signals are detected in the TTI. The reference signals can correspond to downlink reference signals, such as CRS, as described above. Accordingly, at Block 808, the UE may receive downlink communications during the configurable TTI. Communicating component 361 can receive the downlink communications (e.g., from eNB 504) during the configurable TTI. It is to be appreciated that where the transceiver 506 is configured for uplink communications when the one or more reference signals are detected at 804, receiving downlink communications at Block 808 may also include communicating component 361 switching the transceiver 506 and/or related resources (e.g., a modem processor, antenna, etc.) to receive downlink signals during the TTI.

Where one or more reference signals are not detected in the TTI at Block 804, at Block 810 the UE may determine that the configurable TTI is configured for uplink communications. Downlink/uplink switch detecting component 512 can determine that the TTI is configured for uplink communications where the one or more reference signals are not detected in the TTI. Accordingly, at Block 812, the UE may transmit uplink communications during the configurable TTI, or at Block 814, may enter a sleep mode during one or more TTIs. Communicating component 361 can transmit the uplink communications during the configurable TTI and/or enter the sleep mode during one or more TTIs. For example, transmitting the uplink communications at Block 812 can include communicating component 361 transmitting uplink control communications (e.g., ACK/NACK, CSI, SR, etc., which may be transmitted over semi-statically assigned resources) at least in the first configurable TTI determined to be configure for uplink communications. In addition, in an example, entering the sleep mode at Block 804 may include suspending or deactivating one or more resources of the UE 502 (e.g., transceiver 506 or components thereof, a modem processor, an antenna, etc.) during one or more TTIs. For example, this may occur where a TTI is determined to be configured for uplink communications, and the UE 502 did not receive an uplink resource grant or is finished transmitting to the eNB 504, etc. It is to be appreciated that where the transceiver 506 is configured for downlink communications when the one or more reference signals are not detected at 804, transmitting downlink communications at Block 812 and/or entering the sleep mode at Block 814 may also include communicating component 361 switching the transceiver 506 and/or related resources (e.g., a modem processor, antenna, etc.) to transmit uplink signals during the TTI.

In either case, method 800 can proceed from Block 808 or 812/814 to Block 802 to continue monitoring the configurable TTIs for one or more reference signals to determine whether the configurable TTIs are configured for uplink or downlink communications.

Figure 9:
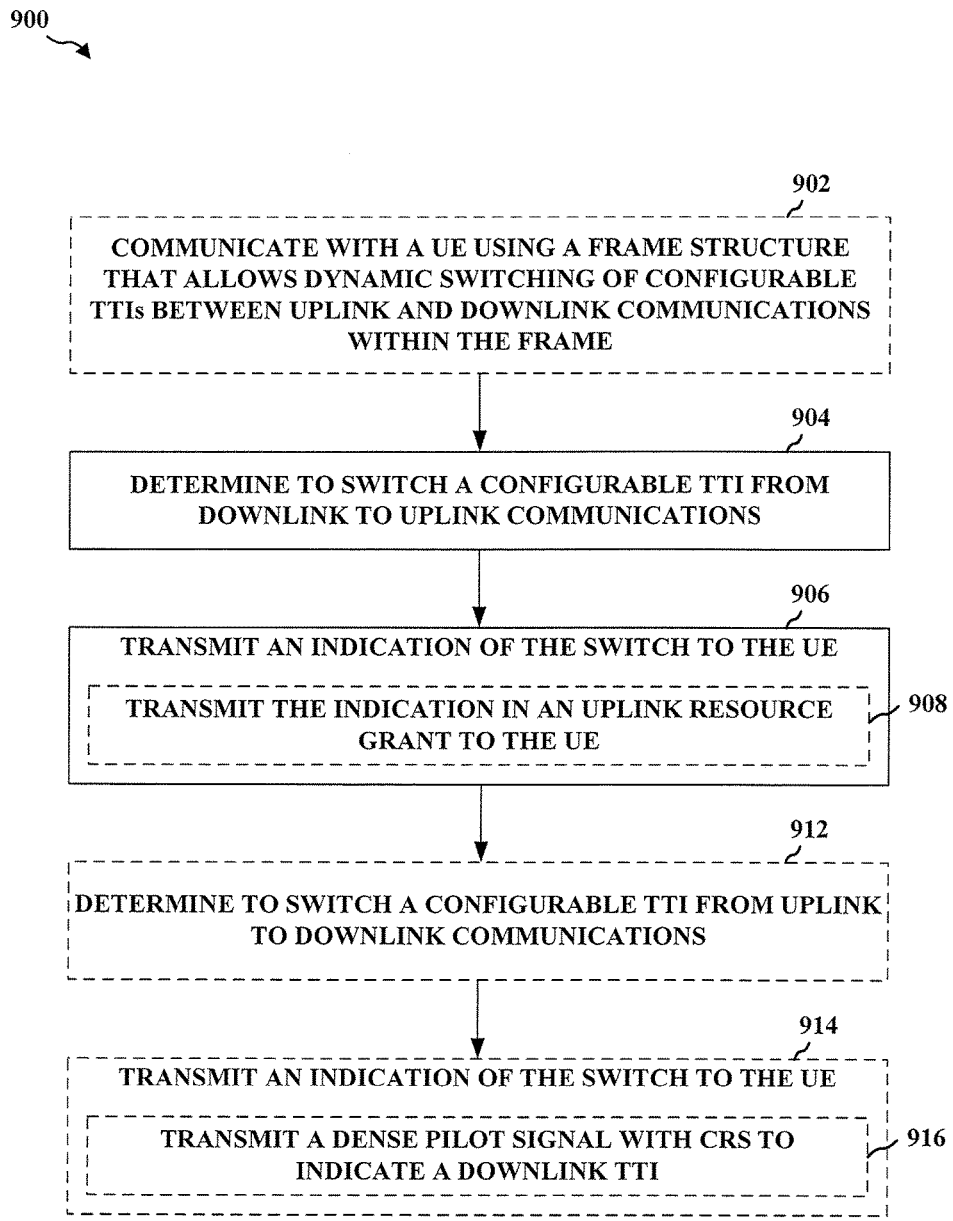
FIG. 9 is a flow chart of an example method of indicating whether a configurable TTI is configured for downlink or uplink communications.

FIG. 9 illustrates an example method 900 for indicating (e.g., by an eNB) a switch between downlink and uplink communications for one or more configurable TTIs. At Block 902, the eNB may communicate with a UE using a frame structure that allows dynamic switching of configurable TTIs between uplink and downlink communications within the frame. Scheduling component 302 (FIG. 5) can communicate with the UE (e.g., UE 502) using the frame structure that allows dynamic switching of configurable TTIs between uplink and downlink communications within the frame. In one example, resource grant generating component 520 can configure UE 502 with resources designated based on the frame structure, as described, which scheduling component 302 can use to transmit and/or receive communications to/from UE 502. In addition, for example, scheduling component 302 can transmit downlink reference signals or other signals over configurable TTIs configured for downlink communications, dedicated downlink TTIs, etc. In an example, the frame structure can be similar to frame structure 400 (FIG. 4) including dedicated downlink TTIs, TTIs configurable for either uplink or downlink communications, and/or dedicated uplink TTIs.

At Block 904, the eNB may determining to switch a configurable TTI from downlink to uplink communications. Scheduling component 302 can determine to switch the configurable TTI from downlink to uplink communications. As described, for example, scheduling component 302 can determine to switch configurable TTIs from downlink to uplink communications based at least in part on one or more parameters of the eNB 504, such as parameters indicative of a load at the eNB 504, delay requirements for packets at the eNB 504, etc., one or more parameters of the UE 502, such as parameters indicative of a buffer status, quality of service, subscription level, etc. of the UE 502, one or more parameters regarding a time interval over which to switch between downlink and uplink communications, delay requirements for packets at the UE 502, etc., and/or the like. Thus, for example, scheduling component 302 may determine to switch configurable TTIs from downlink to uplink communications and/or vice versa to attain a desired downlink or uplink latency. In another example, eNB 504 may receive instructions from one or more network components and/or a request (e.g., SR) from a UE, such as UE 502, to switch from downlink to uplink communications.

At Block 906, the UE may transmit an indication of the switch to the UE. Downlink/uplink switch indicating component 522 can transmit the indication of the switch to the UE (e.g., UE 502). For example, the switch may include an explicit or implicit indicator, as described above (e.g., a resource grant or other indicator 580, one or more reference signals, etc.). In one example, in transmitting the indication of the switch at Block 906, at Block 908, the eNB may optionally transmit the indication in an uplink resource grant to the UE. Resource grant generating component 520 can generate an uplink resource grant for UE 502 to include the indication, and thus scheduling component 302 can transmit the indication in the uplink resource grant to the UE 502. Accordingly, for example, receipt of the uplink resource grant can indicate when the switch is to occur (e.g., an explicit indication of the TTI where then switch is to occur, an indicated or known a number of TTIs after receiving the grant, etc.). In another example, as described, transmitting the indication at Block 906 may include scheduling component 302 transmitting another indicator to the UE 502 (e.g., a heads-up indicator of the switch). In this regard, for example, the indicator can indicate a switch to uplink communications is to occur in a next configurable TTI, and/or can explicitly indicate a subsequent TTI at which the switch is to occur.

At Block 912, the eNB may optionally determine to switch a configurable TTI from uplink to downlink communications. Scheduling component 302 can determine to switch the configurable TTI from uplink to downlink communications. As described, for example, scheduling component 302 can determine to switch configurable TTIs from downlink to uplink communications based at least in part on one or more parameters of the eNB 504 such to achieve a desired uplink and/or downlink latency, etc.

At Block 914, the UE may transmit an indication of the switch to the UE. Scheduling component 302 can transmit the indication of the switch to the UE 502. As described for example, the indication transmitted in the uplink resource grant or other indicator 580 may also include an indication of when the TTIs will be switched back to downlink communications. For example, the indication may include a size of the uplink resource grant, which can indicate a switch back to downlink communications is to occur after the uplink resource grant, or another indication of a switch back to downlink communications (e.g., an index of the TTI during which the switch is to occur, a number of TTIs after which the switch is to occur, etc.), as described. Similarly, for non-scheduled UEs (and/or scheduled UEs in another example), downlink uplink switch indicating component 522 can generate the other indicator (e.g., a heads-up indicator) identifying when a switch to uplink communications is to occur. Moreover, in an example, the indicator may also specify a burst length of an uplink data burst, an index of the TTI during which the switch is to occur, etc., so that a TTI at which a switch back to downlink communications is to occur can be identified.

In another example, as described, scheduling component 302 can transmit downlink reference signals and/or downlink grants (generated by resource grant generating component 520) when scheduling component 302 determines to switch the configurable TTIs to downlink communications. This may occur without explicit notification to the UE 502 and/or other UEs. UE 502 can accordingly determine the switch by detecting receipt of the reference signals, decoding one or more control channels based on the reference signal, etc., as described above. Accordingly, in one example, in transmitting the indication of the switch to the UE at Block 914, at Block 916, the UE may transmit a dense pilot signal with CRS to indicate a downlink TTI. Scheduling component 302 can transmit the dense pilot signal with the CRS to indicating the downlink TTI. For example, scheduling component 302 can transmit the dense pilot signal using a plurality of subcarriers (e.g., all available subcarriers in a bandwidth utilized by the UE 502 to communicate with eNB 504), which may occur in the first TTI of a downlink burst, to facilitate improved receipt and detection by the UE 502. This can assist the UE 502 in performing an initial channel estimation of one or more CRSs based on the dense pilot signal to determine the pilot sequence of the CRS, as described above, for subsequently determining whether CRS is present in one or more configurable TTIs to detect a switch to downlink communications.

Figure 10:
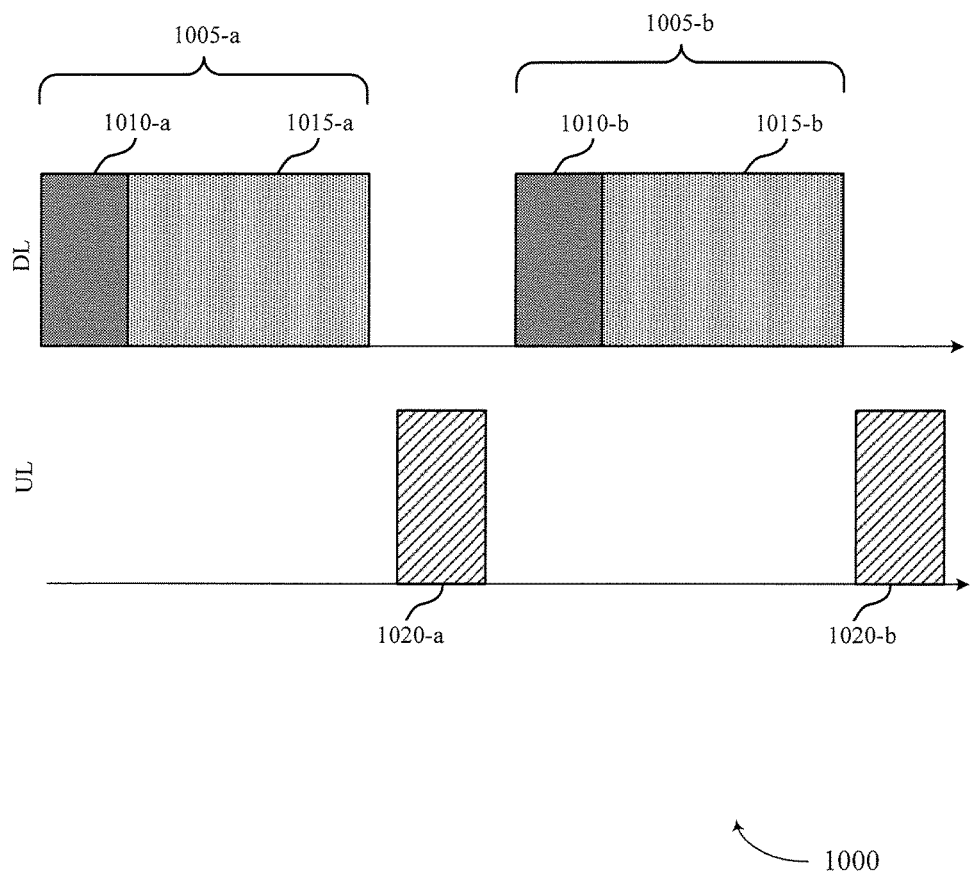
FIG. 10 is a diagram illustrating an example communication timeline having TTIs configured for uplink or downlink communications in dynamic TDD frame structures.

FIG. 10 illustrates an example of a communication timeline 1000 having TTIs as configured for uplink or downlink communications in dynamic TDD frame structures (e.g., frame structure 400 in FIG. 4), as described herein. Timeline 1000 may be used for communication between a UE 502 and an eNB 504, as described above. For example, in some cases, timeline 1000 include signals such as uplink signals 508 and/or downlink signals 509. The pilot transmissions shown on timeline 1000 may be used by UE 502 (e.g., using reference signal monitoring component 514) to determine whether a TTI is configured for uplink or downlink communications (e.g., and/or whether communications were switched from an uplink burst to a downlink burst, or vice versa, in the TTI), as described.

Timeline 1000 may include downlink (DL) burst 1005-a over one or more TTIs, as described, which can be configured or dedicated for downlink communications. DL burst 1005-a can include preamble DL symbols 1010-a and regular DL symbols 1015-a. In some examples, regular DL symbols 1015-a may include regular pilot signals (e.g., CRS or other reference signals) and preamble DL symbol 1010-a may include a dense pilot signal (e.g., a plurality of embedded reference signal tones, such as CRS tones, in a usable bandwidth, as described). A dense pilot may be sent at the beginning of DL burst 1005-a to facilitate improved baseline channel estimation at the UE 502, as described. Timeline 1000 may also include a second DL burst 1005-b, which in some cases may be sent without prior signaling to the UE 502 (e.g., without an explicit indication that the configurable TTI is switched to downlink communications). DL burst 1005-b may include a preamble DL symbol 1010-b and regular pilot symbols 1015-b, similarly to DL burst 1005-a. Timeline 1000 may also include UL burst 420-a and UL burst 420-b, which can relate to a UE (e.g., UE 502) transmitting uplink signals 508 to eNB 504 based on an uplink resource grant provided to the UE. DL burst 405-b may be received subsequent to an UL burst (e.g., UL burst 420-a), or it may be received immediately following DL burst 405-a (not shown).

Irrespective of the order of reception, a UE 502 (e.g., downlink/uplink switch detecting component 512) may determine whether a TTI is configured for uplink or downlink communications based at least in part on a detection of a pilot signal (e.g., reference signal) whose pilot sequence is known (e.g., based on a previous configuration or observation of the reference signal). For example, preamble DL symbol 1010-a may include CRS, whose presence may indicate to a UE 502 that DL burst 1005-a is a DL burst. In some examples, a UE 502 (e.g., downlink/uplink switch detecting component 512) may confirm a blind detection of DL burst 1010-a by decoding a known physical layer channel (e.g., PDCCH, PCFICH, etc.). UL burst 1020-a may not include a reference signal whose pilot sequence is known (e.g., CRS). Thus, the UE 502 may detect an absence of the reference signal (e.g., based on absence of the pilot sequence) and determine that UL burst 1020-a is an UL burst (and thus the related TTI is an uplink TTI).

Figure 11:
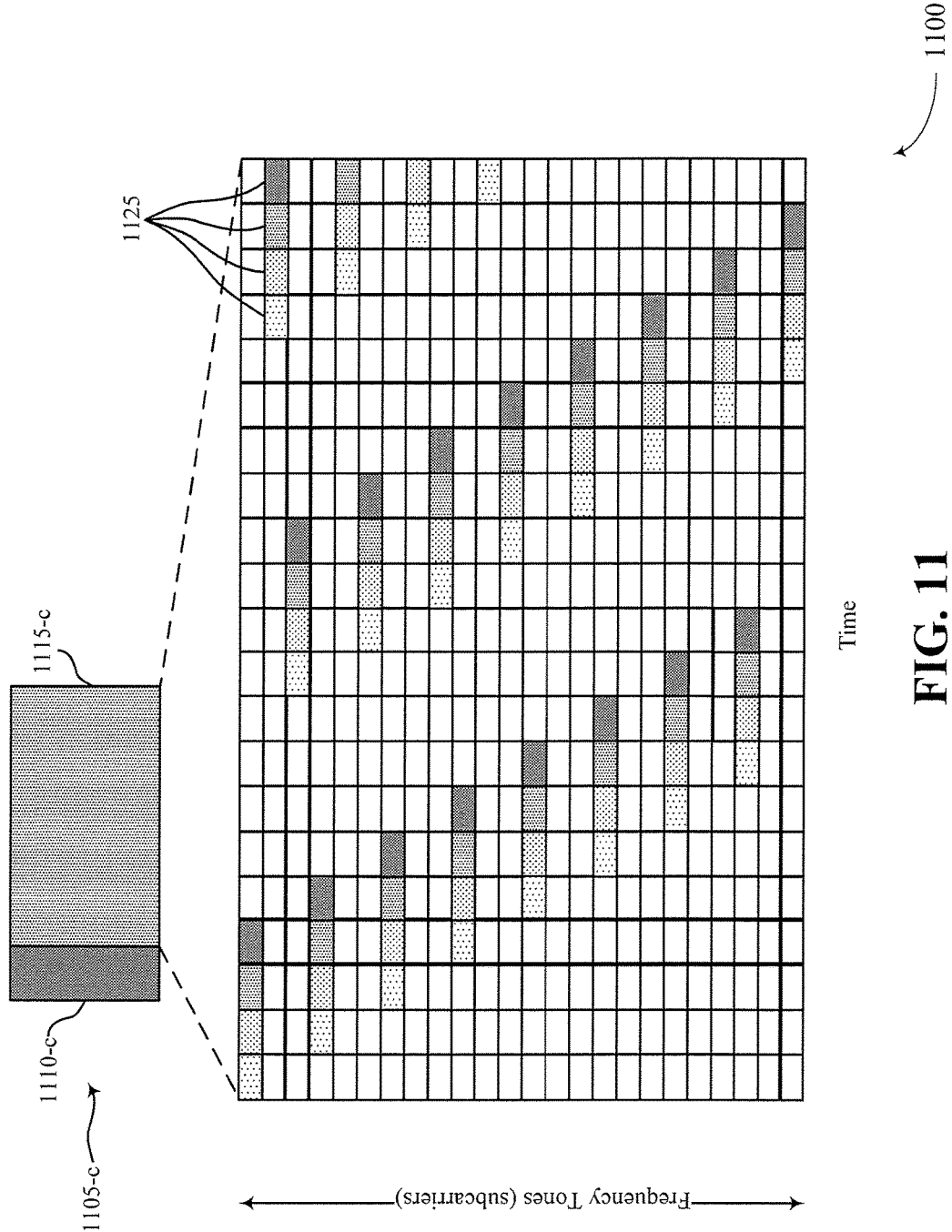
FIG. 11 is a diagram illustrating an example downlink pilot burst pattern for one or more reference signals in accordance with aspects described herein.

FIG. 11 illustrates an example of DL burst pilot pattern 1100 including an expanded view of regular DL symbols 1115-c for blind detection of whether a TTI is configured for uplink or downlink communications in dynamic TDD frame structures (e.g., frame structure 400 in FIG. 4), as described herein. DL burst 1105-c may be used for communications between a UE 502 and an eNB 504, as described above, and may be an aspect of DL burst 1005-a and DL burst 1005-b, as described with reference to FIG. 10.

DL burst pilot pattern 1100 may include an example of time and frequency resource elements of DL burst 1105-*c* representing example locations of pilot tones 1125. For example, pilot tones for the first antenna may be transmitted on regularly spaced tones (every 25 tone in this example) in each TTI (e.g., symbol), where the index (offset) of the pilot tone can be shifted by a certain amount (3 tones in this example) every symbol. The pattern may be repeated every N symbols, where N is a positive integer (e.g., 25 symbols in this example). Pilots for different transmit antennas may be transmitted on different tone locations. DL burst pilot pattern 1102 represents one possible pattern for pilot transmission in a DL burst 1105, but other pilot patterns may also be used.

In an example, a UE 502 may monitor a wireless channel from an eNB 504 for a pilot transmission (e.g., as part of DL burst pilot pattern 1100). In some cases, the UE 502 (e.g., reference signal monitoring component 514) may detect a pilot sequence and may determine (e.g., by downlink/uplink switch detecting component 512) that the transmission is a DL transmission (e.g., DL burst 1105-*c*), and thus that the corresponding TTI is configured for downlink communications.

Downlink/uplink switch detecting component 512 may also verify that the TTI is configured for downlink communications by decoding a known physical layer DL channel in the TTI or in a subsequent TTI (e.g., based on the reference signal corresponding to the pilot sequence). In another example, downlink/uplink switch detecting component 512 may identify an absence of a pilot sequence on the wireless channel during the TTI and may determine that the TTI is not configured for downlink communications (e.g., that the TTI is configured for uplink communications).

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for communicating using dynamic uplink and downlink transmission time interval (TTI) switching in a wireless network, comprising:

receiving a configuration indicating one or more downlink TTIs in a frame structure that are dedicated for downlink communications and one or more uplink TTIs in the frame structure that are dedicated for uplink communications;

receiving a notification from a network entity of switching a configurable TTI in the frame structure from being configured for downlink communications to being configured for uplink communications, wherein the configurable TTI is one of a plurality of TTIs in the frame structure, not including the one or more downlink TTIs or the one or more uplink TTIs, that allows dynamic switching of configurable TTIs between being configured for downlink and uplink communications within a frame; and transmitting uplink communications to the network entity during the configurable TTI based at least in part on the notification, wherein receiving the notification comprises:

determining that a previous configurable TTI is configured for downlink communications based at least in part on detecting one or more reference signals in the previous configurable TTI; and determining that the configurable TTI is configured for uplink communications based at least in part on detecting that the configurable TTI does not include the one or more reference signals.

2. The method of claim 1, wherein transmitting comprises transmitting control data to the network entity in the configurable TTI.

3. The method of claim 2, wherein the control data includes one or more acknowledgement or non-acknowledgement indicators, channel state information reports, or scheduling requests.

4. The method of claim 1, further comprising transmitting uplink communications to the network entity during one or more subsequent configurable TTIs configured for uplink communications in an uplink burst based at least in part on the notification.

5. The method of claim 4, wherein receiving the notification further includes receiving an uplink resource grant that indicates a length of the uplink burst before switching a subsequent configurable TTI to being configured for downlink communications for a downlink burst.

6. The method of claim 1, wherein receiving the notification further includes receiving a bit in a previous TTI configured for downlink communications, wherein the bit indicates that the configurable TTI is to be configured for uplink communications and/or that a plurality of subsequent configurable TTIs, including the configurable TTI, are configured for uplink communications for an uplink data burst.

7. The method of claim 1, further comprising:

determining a next configurable TTI to be switched for downlink communications for a next downlink burst based at least in part on the notification; and receiving control data from the network entity in the next configurable TTI.

8. The method of claim 1, further comprising determining a next configurable TTI to be switched for downlink communications for a next downlink burst based at least in part on a burst length of an uplink data burst related to the configurable TTI, wherein the burst length is specified in an uplink resource grant related to the configurable TTI.

9. The method of claim 1, further comprising:
monitoring for signals from the network entity in one or more configurable TTIs following the configurable TTI over which the uplink communications are transmitted; and
determining switching of the one or more configurable TTIs back to being configured for downlink communications based at least in part on at least one of detecting a downlink reference signal in the one or more configurable TTIs following the configurable TTI or decoding a downlink control channel based at least in part on detecting the downlink reference signal.

10. The method of claim 1, further comprising:
monitoring for signals from the network entity in one or more configurable TTIs following transmitting uplink communications in a plurality of configurable TTIs; and
determining switching of the one or more configurable TTIs back to being configured for downlink communications based at least in part on detecting a downlink reference signal in the configurable TTIs following transmitting uplink communications in the plurality of configurable TTIs.

11. The method of claim 1, wherein detecting that the configurable TTI does not include the one or more reference signals comprises:
detecting a pilot sequence of the one or more reference signals using a channel estimate obtained from the one or more reference signals in the previous configurable TTI; and
determining that the pilot sequence of the one or more reference signals is not present in the configurable TTI.

12. The method of claim 1, wherein determining that the previous configurable TTI is configured for downlink communications further includes decoding a physical layer channel from one or more signals received in the previous configurable TTI.

13. A user equipment for communicating using dynamic uplink and downlink transmission time interval (TTI) switching in a wireless network, comprising:
a transceiver;
at least one processor communicatively coupled with the transceiver via a bus for communicating signals in the wireless network; and
a memory communicatively coupled with the at least one processor and/or the transceiver via the bus;
wherein the at least one processor and the memory are operable to:
receive a configuration indicating one or more downlink TTIs in a frame structure that are dedicated for downlink communications and one or more uplink TTIs in the frame structure that are dedicated for uplink communications;
receive, via the transceiver, a notification from a network entity of switching a configurable TTI in the frame structure from being configured for downlink communications to being configured for uplink communications, wherein the configurable TTI is one of a plurality of TTIs in the frame structure, not including the one or more downlink TTIs or the one or more uplink TTIs, that allows dynamic switching of configurable TTIs between being configured for downlink and uplink communications within a frame; and
transmit, via the transceiver, uplink communications to the network entity during the configurable TTI based at least in part on the notification,
wherein the at least one processor and the memory are operable to receive the notification at least in part by:
determining that a previous configurable TTI is configured for downlink communications based at least in part on detecting one or more reference signals in the previous configurable TTI; and
determining that the configurable TTI is configured for uplink communications based at least in part on detecting that the configurable TTI does not include the one or more reference signals.

14. The user equipment of claim 13, wherein the uplink communications correspond to control data transmitted to the network entity in the configurable TTI.

15. The user equipment of claim 14, wherein the control data includes one or more acknowledgement or non-acknowledgement indicators, channel state information reports, or scheduling requests.

16. The user equipment of claim 13, wherein the at least one processor and the memory are further operable to transmit uplink communications to the network entity during one or more subsequent configurable TTIs configured for uplink communications in an uplink burst based at least in part on the notification.

17. The user equipment of claim 16, wherein the at least one processor and the memory are configured to receive the notification at least in part by receiving an uplink resource grant that indicates a length of the uplink burst before switching a subsequent configurable TTI to being configured for downlink communications for a downlink burst.

18. The user equipment of claim 13, wherein the at least one processor and the memory are configured to receive the notification at least in part by receiving a bit in a previous TTI configured for downlink communications, wherein the bit indicates that the configurable TTI is to be configured for uplink communications and/or that a plurality of subsequent configurable TTIs, including the configurable TTI, are configured for uplink communications for an uplink data burst.

19. The user equipment of claim 13, wherein the at least one processor and the memory are further operable to:
determine a next configurable TTI to be switched for downlink communications for a next downlink burst based at least in part on the notification; and
receive control data from the network entity in the next configurable TTI.

20. The user equipment of claim 13, wherein the at least one processor and the memory are further operable to determine a next configurable TTI to be switched for downlink communications for a next downlink burst based at least in part on a burst length of an uplink data burst related to the configurable TTI, wherein the burst length is specified in an uplink resource grant related to the configurable TTI.

21. The user equipment of claim 13, wherein the at least one processor and the memory are further operable to:
monitor for signals from the network entity in one or more configurable TTIs following the configurable TTI over which the uplink communications are transmitted; and
determine switching of the one or more configurable TTIs back to being configured for downlink communications based at least in part on at least one of detecting a downlink reference signal in the one or more configurable TTIs following the configurable TTI or decoding a downlink control channel based at least in part on detecting the downlink reference signal.

22. The user equipment of claim 13, wherein the at least one processor and the memory are further operable to:

monitor for signals from the network entity in one or more configurable TTIs following transmitting uplink communications in a plurality of configurable TTIs; and determine switching of the one or more configurable TTIs back to being configured for downlink communications based at least in part on detecting a downlink reference signal in the configurable TTIs following transmitting uplink communications in the plurality of configurable TTIs.

23. The user equipment of claim 13, wherein the at least one processor and the memory are operable to detect that the configurable TTI does not include the one or more reference signals at least in part by:

detecting a pilot sequence of the one or more reference signals using a channel estimate obtained from the one or more reference signals in the previous configurable TTI; and determining that the pilot sequence of the one or more reference signals is not present in the configurable TTI.

24. The user equipment of claim 13, wherein the at least one processor and the memory are further operable to determine that the previous configurable TTI is configured for downlink communications at least in part by decoding a physical layer channel from one or more signals received in the previous configurable TTI.

25. A user equipment for communicating using dynamic uplink and downlink transmission time interval (TTI) switching in a wireless network, comprising:

means for receiving a configuration indicating one or more downlink TTIs in a frame structure that are dedicated for downlink communications and one or more uplink TTIs in the frame structure that are dedicated for uplink communications;

means for receiving a notification from a network entity of switching a configurable TTI in the frame structure from being configured for downlink communications to being configured for uplink communications, wherein the configurable TTI is one of a plurality of TTIs in the frame structure, not including the one or more downlink TTIs or the one or more uplink TTIs, that allows dynamic switching of configurable TTIs between being configured for downlink and uplink communications within a frame; and means for transmitting uplink communications to the network entity during the configurable TTI based at least in part on the notification, wherein the means for receiving the notification comprises:

means for determining that a previous configurable TTI is configured for downlink communications based at least in part on detecting one or more reference signals in the previous configurable TTI; and means for determining that the configurable TTI is configured for uplink communications based at least in part on detecting that the configurable TTI does not include the one or more reference signals.

26. The user equipment of claim 25, wherein the means for transmitting transmits the uplink communications as control data to the network entity in the configurable TTI.

27. The apparatus of claim 25, wherein the means for determining that the configurable TTI is configured for uplink communications detects that the configurable TTI does not include the one or more reference signals at least in part by:

detecting a pilot sequence of the one or more reference signals using a channel estimate obtained from the one or more reference signals in the previous configurable TTI; and determining that the pilot sequence of the one or more reference signals is not present in the configurable TTI.

28. A non-transitory computer-readable storage medium comprising computer-executable code for communicating using dynamic uplink and downlink transmission time interval (TTI) switching in a wireless network, the code comprising:

code for receiving a configuration indicating one or more downlink TTIs in a frame structure that are dedicated for downlink communications and one or more uplink TTIs in the frame structure that are dedicated for uplink communications;

code for receiving a notification from a network entity of switching a configurable TTI in the frame structure from being configured for downlink communications to being configured for uplink communications, wherein the configurable TTI is one of a plurality of TTIs in the frame structure, not including the one or more downlink TTIs or the one or more uplink TTIs, that allows dynamic switching of configurable TTIs between being configured for downlink and uplink communications within a frame; and code for transmitting uplink communications to the network entity during the configurable TTI based at least in part on the notification, wherein code for receiving the notification comprises:

code for determining that a previous configurable TTI is configured for downlink communications based at least in part on detecting one or more reference signals in the previous configurable TTI; and code for determining that the configurable TTI is configured for uplink communications based at least in part on detecting that the configurable TTI does not include the one or more reference signals.

29. The non-transitory computer-readable storage medium of claim 28, wherein the code for transmitting transmits the uplink communications as control data to the network entity in the configurable TTI.

30. The non-transitory computer-readable storage medium of claim 28, wherein the code for determining that the configurable TTI is configured for uplink communications detects that the configurable TTI does not include the one or more reference signals at least in part by:

detecting a pilot sequence of the one or more reference signals using a channel estimate obtained from the one or more reference signals in the previous configurable TTI; and determining that the pilot sequence of the one or more reference signals is not present in the configurable TTI.

\* \* \* \* \*